(12) United States Patent
Sorimoto

(10) Patent No.: US 10,870,228 B2
(45) Date of Patent: Dec. 22, 2020

(54) MOLDING DIE PROJECTION MECHANISM AND MOLDING DIE COMPRISING SAME PROJECTION MECHANISM

(71) Applicant: TECHNOCRATS CORPORATION, Hiroshima (JP)

(72) Inventor: Masanori Sorimoto, Hiroshima (JP)

(73) Assignee: TECHNOCRATS CORPORATION, Hiroshima (JP)

( * ) Notice: Subject to any disclaimer, the term of this patent is extended or adjusted under 35 U.S.C. 154(b) by 321 days.

(21) Appl. No.: 15/821,022

(22) Filed: Nov. 22, 2017

(65) Prior Publication Data

US 2018/0147763 A1 May 31, 2018

(30) Foreign Application Priority Data

Nov. 28, 2016 (JP) .................................. 2016-230195

(51) Int. Cl.
*B29C 45/40* (2006.01)
*B29C 45/44* (2006.01)

(52) U.S. Cl.
CPC ............ *B29C 45/401* (2013.01); *B29C 45/44* (2013.01); *B29C 45/40* (2013.01); *B29C 2045/4094* (2013.01); *B29C 2045/445* (2013.01)

(58) Field of Classification Search
CPC .......... B29C 45/401; B29C 2045/4021; B29C 45/44
See application file for complete search history.

(56) References Cited

U.S. PATENT DOCUMENTS

2004/0227272 A1* 11/2004 Saito .................... B29C 45/561
264/259

FOREIGN PATENT DOCUMENTS

| CN | 102848535 | 1/2013 |
|---|---|---|
| EP | 2 628 587 A1 | 8/2013 |
| JP | 54-89373 | 6/1979 |
| JP | 62-255109 | 11/1987 |
| JP | 2-9520 | 1/1990 |
| JP | 5-200806 | 8/1993 |
| JP | 8-216203 | 8/1996 |

(Continued)

OTHER PUBLICATIONS

Chinese Office Action dated Jun. 3, 2019 in corresponding Chinese Patent Application No. 201711211643.0.

(Continued)

*Primary Examiner* — Jacob T Minskey
*Assistant Examiner* — Jennifer A Kessie

(57) ABSTRACT

A projection mechanism of a molding die configured to mold a molded article by a fixed-side die and a movable-side die, the projection mechanism including: a projection pin using a reaction force of a spring as a drive source; and a first spring and a second spring configured to project the projection pin, wherein the first spring has a maximum reaction force in a die clamping state, and projects the projection pin while gradually reducing the reaction force in a projection process, and the second spring projects the projection pin with a constant reaction force while projecting the projection pin from the die clamping state, where stop of movement of the second projection pin during the projection process causes compression of the second spring to increase the reaction force of the second spring, thereby energizing the projection pin to further project the projection pin.

17 Claims, 18 Drawing Sheets

(56) References Cited

FOREIGN PATENT DOCUMENTS

| JP | 10-16014 | 1/1998 |
| JP | 2002-172641 | 6/2002 |
| JP | 2014-97628 | 5/2014 |
| JP | 2014-205315 | 10/2014 |
| KR | 10-2007-0062402 | 6/2007 |

OTHER PUBLICATIONS

Korean Notification of Reasons for Refusal dated Aug. 17, 2018 in corresponding Korean Patent Application No. 10-2017-0159547.
Extended European Search Report dated Mar. 7, 2018, in corresponding European Patent Application No. 17203990.1, 7 pgs.
Notice of Reasons for Refusal, dated Sep. 30, 2020, in corresponding Japanese Application No. 2016-230195 (8 pp.).

\* cited by examiner

MOLDING DIE PROJECTION MECHANISM AND MOLDING DIE COMPRISING SAME PROJECTION MECHANISM

CROSS-REFERENCE TO RELATED APPLICATIONS

This application is based on and claims Convention priority to Japanese patent application No. 2016-230195, filed Nov. 28, 2016, the entire disclosure of which is herein incorporated by reference as a part of this application.

BACKGROUND OF THE INVENTION

Field of the Invention

The present invention relates to a molding die projection mechanism and a molding die that includes the projection mechanism.

Background Art

A molding die including a two-stage projection mechanism which performs a projection step in two stages is known as a molding die for a molded article having an undercut. Projection mechanisms having various forms and structures have been developed as the two-stage projection mechanism. Examples thereof include: a magnet type two-stage projection mechanism including upper-stage and lower-stage ejector plates and magnets attached thereto; and a two-stage projection mechanism using one ejector plate and a spring (see Japanese Laid-Open Patent Publication No. 2002-172641, Japanese Laid-Open Patent Publication No. H5-200806, and Japanese Laid-Open Utility Model Publication No. H2-9520, for example).

In the molding die including a two-stage projection mechanism described in Japanese Laid-Open Patent Publication No. 2002-172641, a spring is provided between an ejector plate and a mounting plate, a first ejector pin is projected upward by the spring, and a second ejector pin is projected by the ejector plate. Until reaching a predetermined position, the ejector pin projected by the spring ascends together with the ejector plate thereby to project a molded article. After reaching the predetermined position, only the ejector plate ascends to project the molded article.

The molding die according to Japanese Laid-Open Patent Publication No. H5-200806 also employs a configuration similar to that of the molding die described in Japanese Laid-Open Patent Publication No. 2002-172641, wherein an ejector pin which is projected by a spring is used also as an undercut pin for molding an undercut portion. On the other hand, in a resin molding die described in Japanese Laid-Open Utility Model Publication No. H2-9520, a spring is disposed above an ejector plate.

In the projection mechanisms according to the conventional technique (for example, described in Japanese Laid-Open Patent Publication No. 2002-172641, Japanese Laid-Open Patent Publication No. H5-200806, Japanese Laid-Open Utility Model Publication No. H2-9520, and the like) in which drive source is provided by reaction force of a spring, following problems are concerned. Where projection of an undercut molding core is performed using the projection mechanism utilizing the reaction force of a spring as a drive source, the undercut molding core or a member projecting the undercut molding core is sometimes trapped by another member while releasing the undercut. In such a case, the undercut molding core stops in the middle of the projection, and the undercut cannot be released completely. Where the undercut protrudes to the inner side of a molded article such that the undercut so as to be perpendicular to the projection direction of the molded article as in FIG. 1 of Japanese Laid-Open Patent Publication No. 2014-97628, projection of the molded article without completely releasing the undercut may cause damage of the molded article.

Even if the undercut molding core or the like is trapped by another member, it is acceptable if spring has a force that can push out the undercut molding core or the like. However, in the projection mechanism having a spring disposed between an ejector plate and a mounting plate, the spring has the maximum energization force (reaction force) where the ejector plate is at the lowest position. The energization force is reduced by expansion of the spring in association with upward movement of the ejector plate. Therefore, the trapped state is not easily released. On the other hand, in a projection mechanism having a spring disposed above an ejector plate, initial projection force is small due to the expanded state of the spring where the ejector plate is at the lowest position.

In order to solve the above problems, it is conceivable to use a spring that has a large spring constant that allows an undercut molding core or the like to be pushed out, even if the undercut molding core or the like is trapped by another member. However, such a spring is large and takes space, making it difficult to obtain a die of a compact size.

An object of the present invention is to provide a molding die projection mechanism that ensures reliable release of a molded article from the die, and enables size reduction of the molding die, and a movable-side die and/or a fixed-side die, and a molding die including the projection mechanism.

SUMMARY OF THE INVENTION

A first aspect of the present invention is a projection mechanism of a molding die configured to mold a molded article by a fixed-side die (fixed die) and a movable-side die (movable die), the projection mechanism including: a projection pin using a reaction force (restoring force) of a spring as a drive source; and a first spring and a second spring configured to project the projection pin, wherein the first spring has a maximum reaction force in a die clamping state, and projects the projection pin while gradually reducing the reaction force in a projection process, and the second spring projects the projection pin with a constant reaction force while projecting the pin from the die clamping state, where stop of movement of the second projection pin during the projection process causes compression of the second spring to increase the reaction force of the second spring, thereby energizing the projection pin to further project the projection pin.

The projection mechanism of the molding die may be configured such that the second spring is compressed by an ejector plate member when a load not less than the reaction forces of the first spring and the second spring is applied to the projection pin in a direction opposite (reversal) to the projection direction, where the ejector plate member is selected from an ejector plate, a member attached to the ejector plate, and a member that moves in synchronization with the ejector plate.

In the above-described projection mechanism of the molding die, the ejector plate member may have an insertion hole in which the projection pin is inserted, and the projection pin may have a lower flange at a bottom or a lower portion of the projection pin and an upper flange at an intermediate portion or an upper portion of the projection pin, where the lower flange is incapable of passing through the insertion hole, the projection pin is inserted movably in the insertion hole such that the lower flange and the upper flange are located at opposite sides with respect to the ejector plate member, the first spring is provided so as to project the lower flange, and the second spring is provided between the upper flange and the ejector plate member.

In the projection mechanism of the molding die, the projection pin may include travel restriction member configured to restrict movement of the projection pin.

In the projection mechanism of the molding die, the travel restriction member may be the upper flange.

The projection mechanism of the molding die may be configured such that the molding die includes an undercut processing mechanism, and the projection pin is configured to push out the undercut processing mechanism.

The projection mechanism of the molding die may further include an attachment tool configured to attach the first spring to the fixed-side die or the movable-side die, wherein the attachment tool holds the first spring in a predetermined attitude at a predetermined position with respect to the fixed-side die or the movable-side die, and the attachment tool further functions as a stopper configured to prevent movement of the projection pin in the die clamping state.

The projection mechanism of the molding die may be configured such that the attachment tool is a holder housing the first spring, the holder including an outer holder mounted to the fixed-side die or the movable-side die and an inner holder located inside the outer holder and slidably engaged with the outer holder, the first spring is housed in the holder and projects the projection pin, and a top of the inner holder comes into contact with a bottom of the projection pin in the die clamping state, thereby functioning as the stopper.

In the above-described projection mechanism of the molding die, the holder may have an opening such that the first spring housed in the holder is visible through the opening.

The projection mechanism of the molding die may be configured such that the attachment tool is a bar member mounted to the fixed-side die or the movable-side die, the first spring has the bar member inserted therein, and in the die clamping state, a top of the bar member comes into contact with a bottom of the projection pin, thereby functioning as the stopper.

The projection mechanism of the molding die may include a plurality of sets, where each single set includes the projection pin, the first spring, the second spring, or includes the projection pin, the first spring, the second spring, and the attachment tool.

A second aspect of the present invention is a fixed-side die and/or a movable-side die including the above-described projection mechanism of the molding die.

A third aspect of the present invention is a molding die including the above-described fixed-side die and/or the movable-side die.

A fourth aspect of the present invention is a molded article molded by the above-described fixed-side die and/or the movable-side die, or by the molding die.

The projection mechanism of the molding die of the present invention includes a projection pin that utilizes springs as a drive source and that is movable independently of an ejector plate. Thus, two-stage projection is realized by the projection pin and an ejector pin fixed to the ejector plate. Further, if a plurality of the projection pins projected by springs are provided, multi-stage projection in three or more stages can be realized. Thus, even a molded article that has a complicated undercut portion can be reliably released from the die.

In the projection mechanism of the molding die of the present invention, when the first and second springs act on the projection pin, and further, the projection pin is trapped by another member during projection operation, the second spring energizes the projection pin so as to further project the projection pin. Thus, the molded article can be reliably released from the die.

According to the projection mechanism of the molding die of the present invention, a projection mechanism of the molding die including an ejector plate can be configured by the projection pin and the first and second springs, and thus, components having complicated structures are not required. In addition, since the first and second springs cooperate with each other to project the projection pin, it is not necessary to use a large sized spring as each of the first spring and the second spring. Thus, the projection mechanism of the molding die, the fixed-side die and/or the movable-side die, and further, the molding die, can be downsized.

According to the projection mechanism of the molding die of the present invention, it is possible to use an attachment tool that holds the first spring in a predetermined attitude at a predetermined position with respect to the fixed-side die or the movable-side die. Thus it is easy to incorporate the present projection mechanism into the fixed-side die or the movable-side die. In a case of a molding die that opens in the horizontal direction, dropping or tilting of the first spring can be prevented, and thus, the molded article can be reliably released from the die.

According to the projection mechanism of the molding die of the present invention, the attachment tool that holds the first spring in a predetermined attitude at a predetermined position with respect to the fixed-side die or the movable-side die functions as a stopper configured to prevent the movement of the projection pin in a die clamping state. Thus, for example, even if a large load of resin is applied to the projection pin during injection molding, the projection pin does not move, and thus, defective molding can be prevented reliably.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE SEVERAL VIEWS OF THE DRAWING

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE INVENTION

Figure 1:
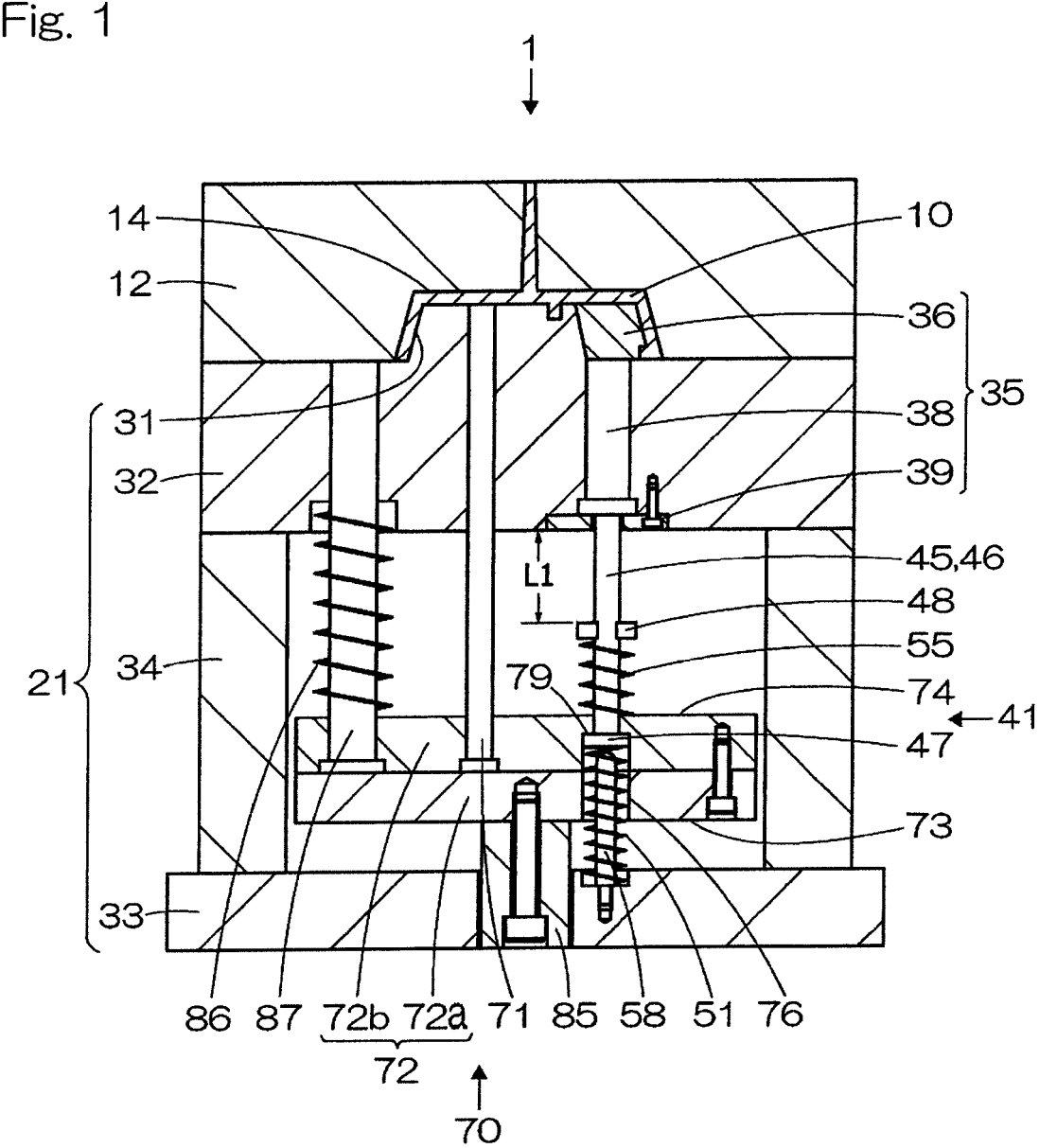
FIG. 1 is a cross-sectional view of a main part of an injection molding die 1 according to a first embodiment of the present invention.
Figure 2:
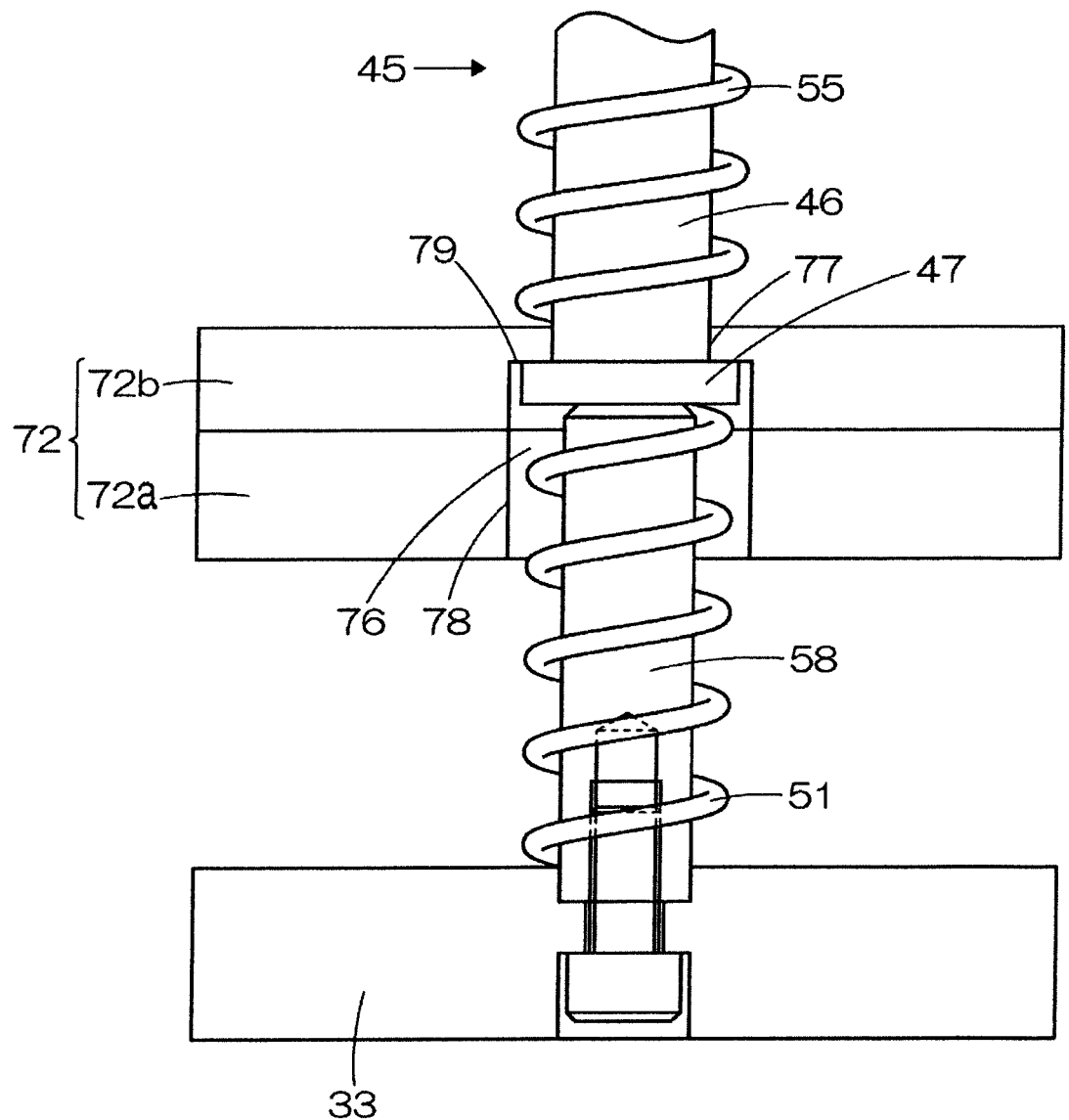
FIG. 2 is a side view of a configuration around a stopper 58 of the injection molding die 1 shown in FIG. 1.
Figure 3:
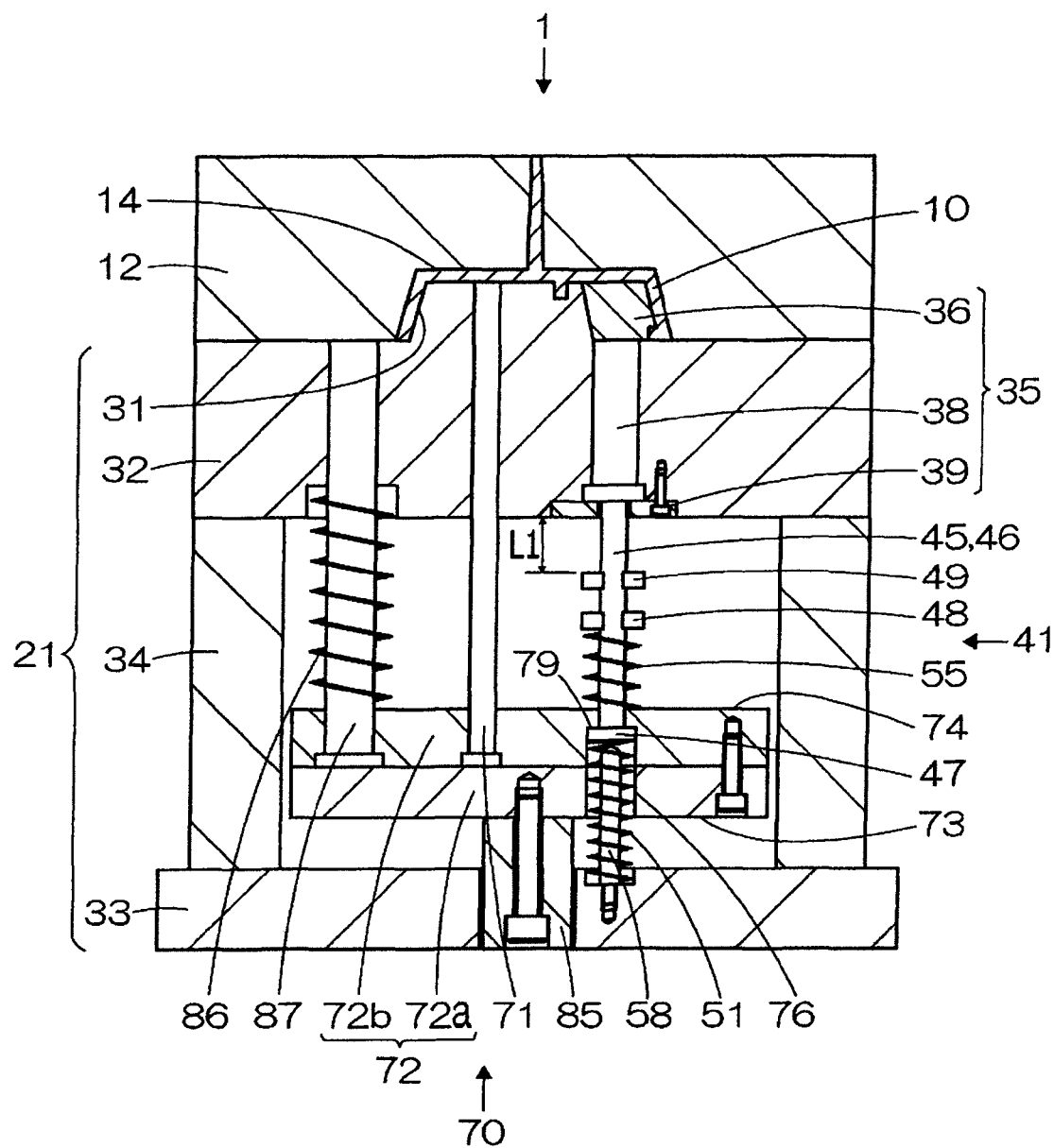
FIG. 3 is a modification of the injection molding die 1 according to the first embodiment of the present invention.
Figure 4:
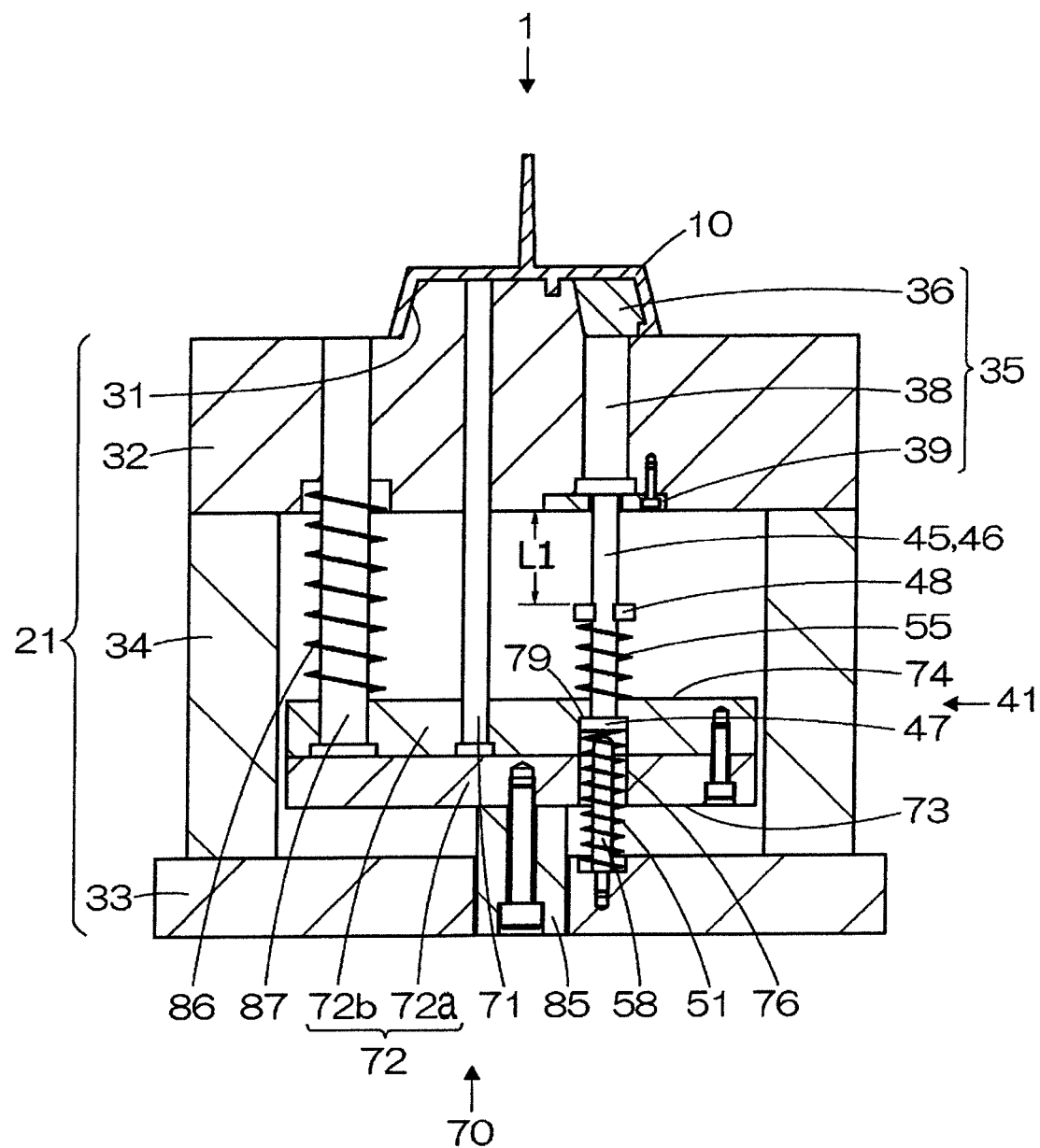
FIG. 4 is a cross-sectional view of a main part showing a state of the injection molding die 1 in FIG. 1 which is opened.
Figure 5:
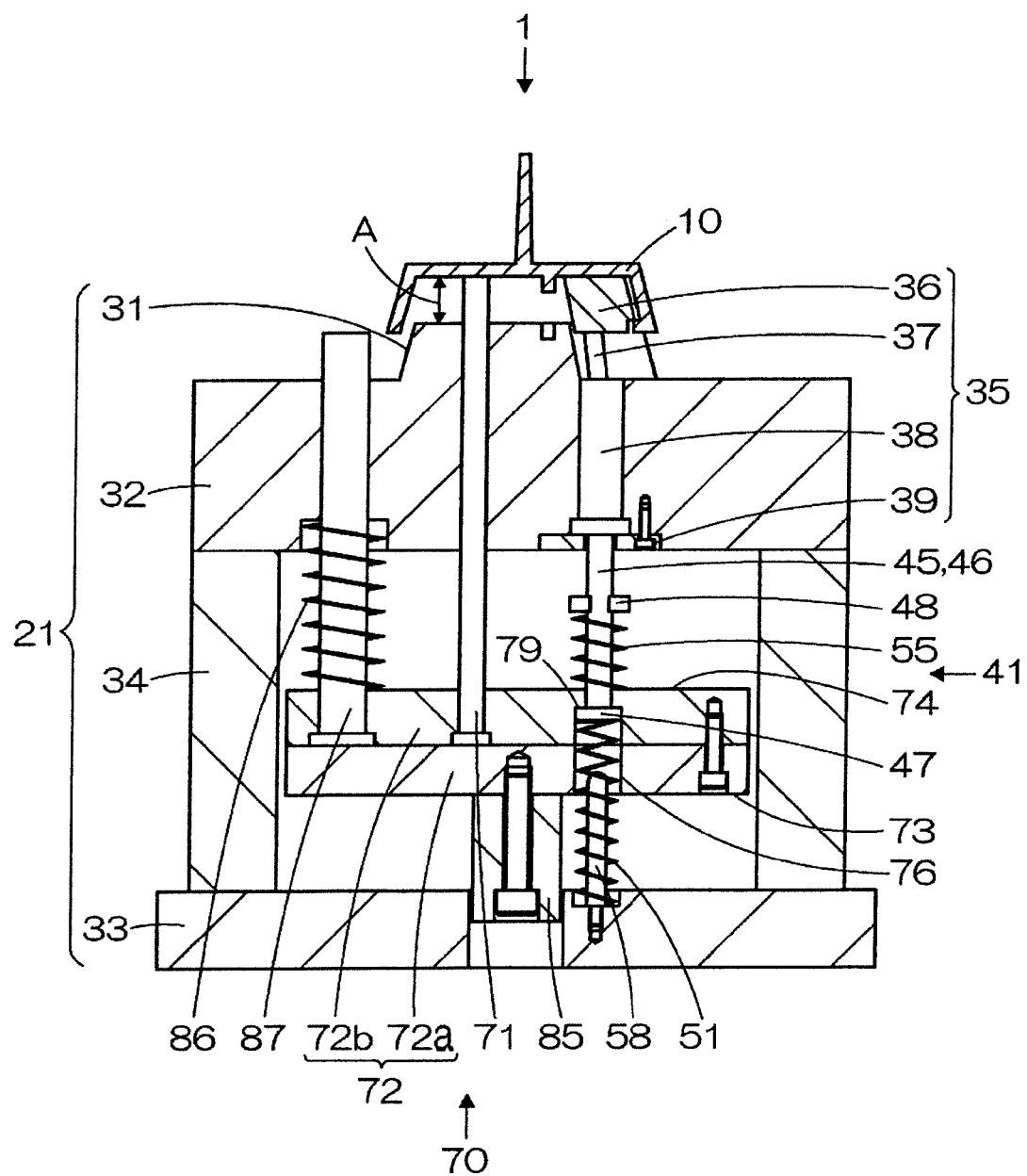
FIG. 5 is a cross-sectional view of a main part showing a state of the injection molding die 1 in FIG. 1 during projection of a molded article.
Figure 6:
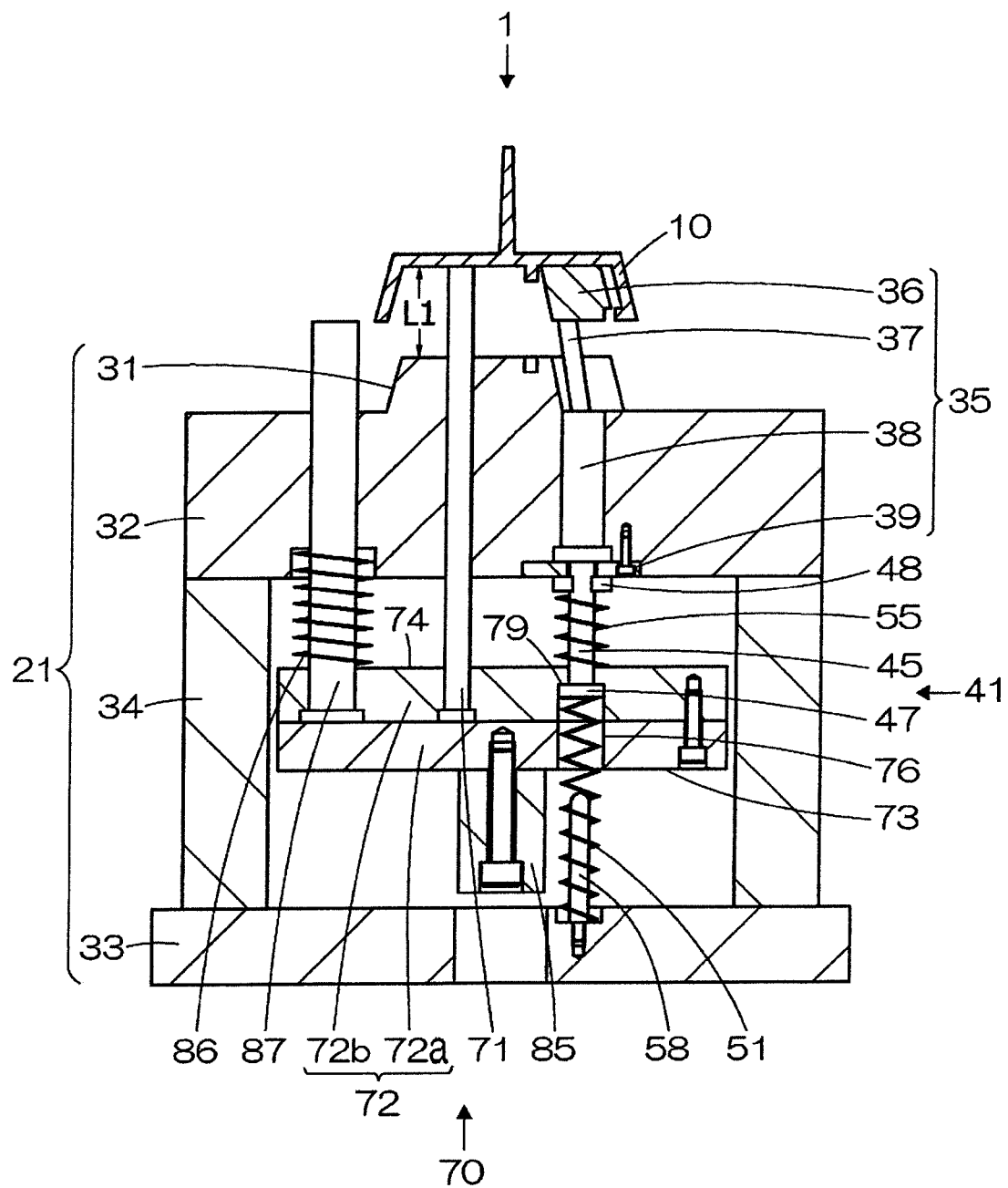
FIG. 6 is a cross-sectional view of a main part showing a state of the injection molding die 1 in FIG. 1 during projection of a molded article.
Figure 7:
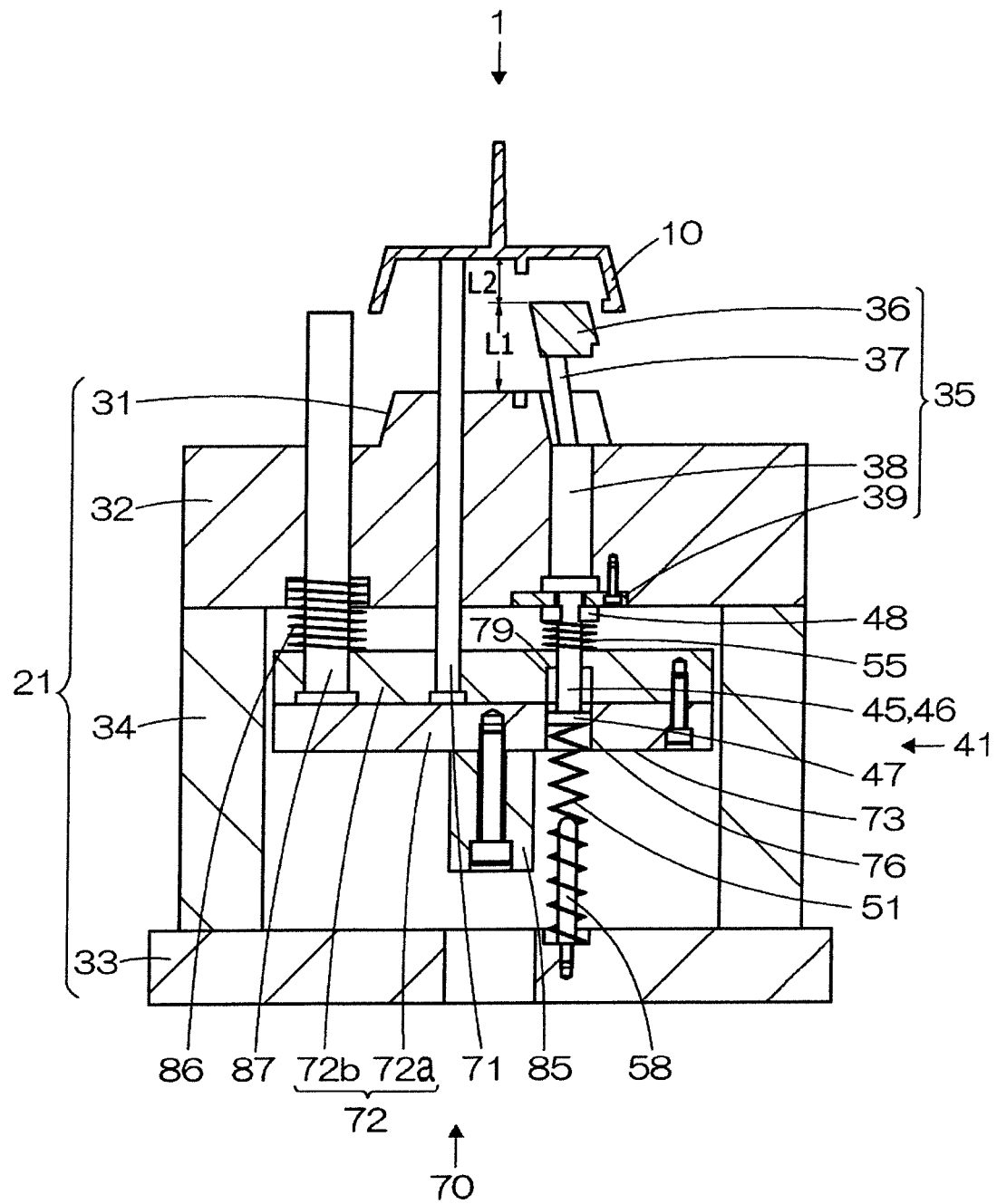
FIG. 7 is a cross-sectional view of a main part showing a state of the injection molding die 1 in FIG. 1 during projection of a molded article.
Figure 8:
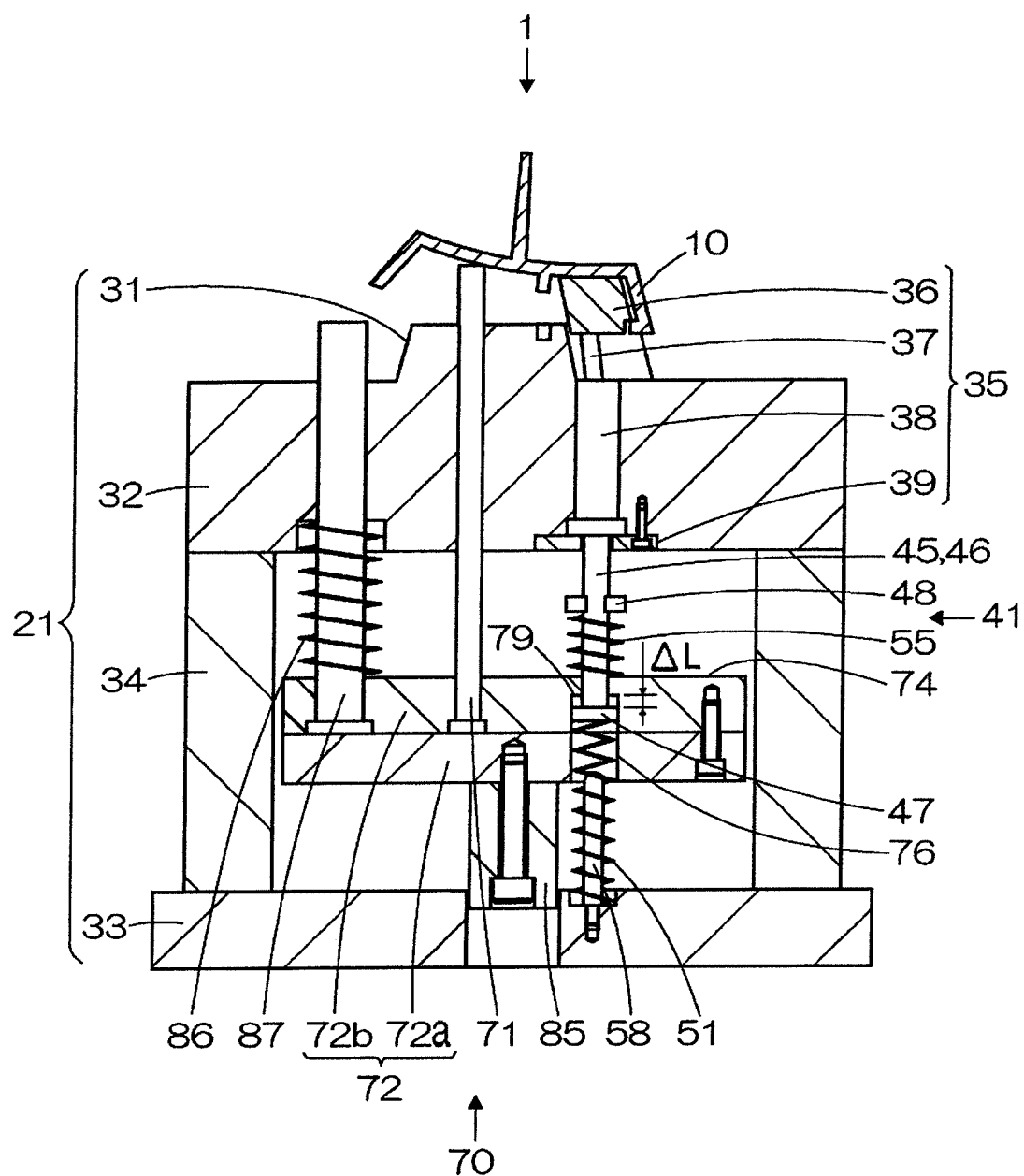
FIG. 8 is a schematic diagram showing a state where a molding piece 36 of the injection molding die 1 in FIG. 1 is trapped by another member in the middle of projection.
Figure 9A:
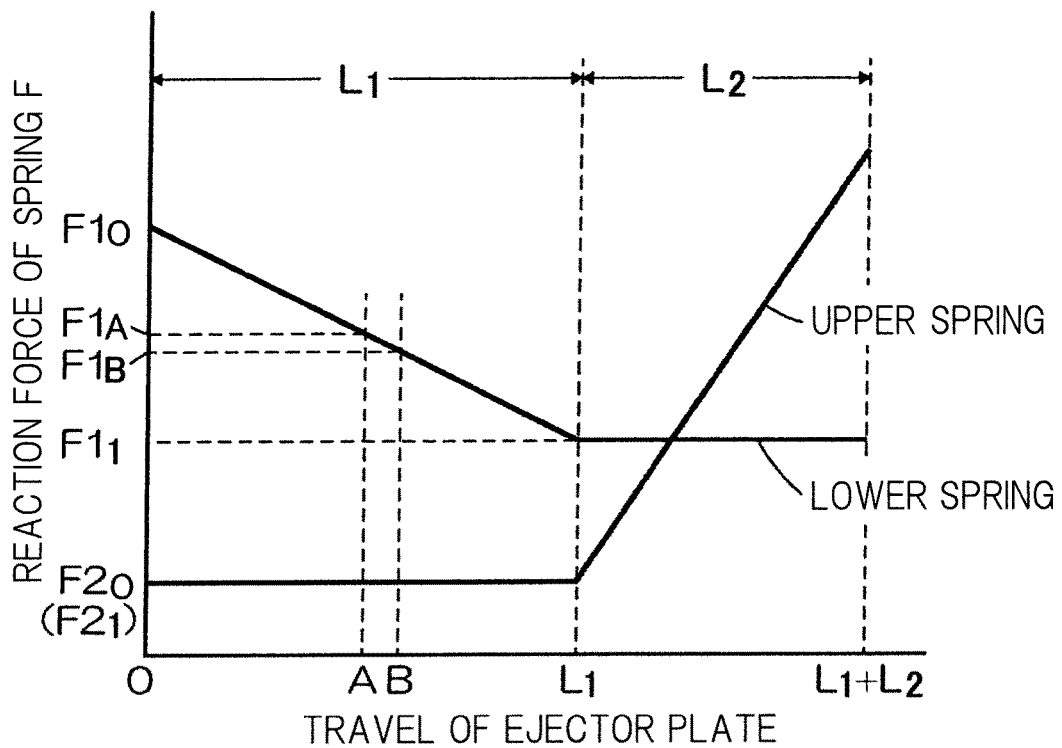
FIGS. 9A and 9B are diagrams for describing reaction forces of a lower spring 51 and an upper spring 55 used in a second projection mechanism 41 of the injection molding die 1 shown in FIG. 1.
Figure 9B:
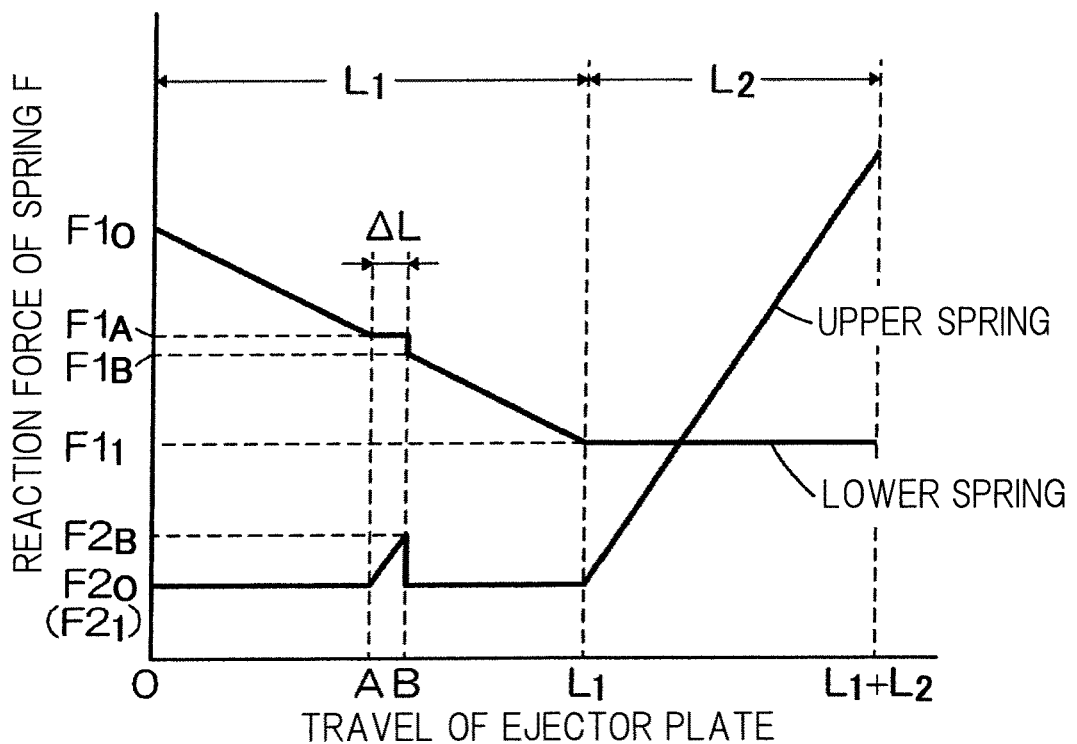

FIG. 1 is a cross-sectional view of a main part of an injection molding die 1 according to a first embodiment of the present invention. FIG. 2 is a diagram for describing a configuration around a stopper 58 of the injection molding die 1. FIG. 3 is a modification of the injection molding die 1 of the first embodiment. FIG. 4 is a cross-sectional view of a main part showing a state of the injection molding die 1 which is opened. FIGS. 5 to 7 are each a cross-sectional view of a main part showing a state of the injection molding die 1 during projection of a molded article. FIG. 8 is a schematic diagram showing a state where a molding piece 36 of the injection molding die 1 is trapped by another member in the middle of projection. FIGS. 9A and 9B are each a diagram for describing reaction forces of a lower spring 51 and an upper spring 55 used in a second projection mechanism 41 of the injection molding die 1. In the present embodiment, "up" and "upward direction" mean "up" and "upward direction" in the drawings, respectively, and in FIG. 1, the direction toward a fixed-side die 12 corresponds to the "up" and "upward direction".

The injection molding die 1 includes two projection mechanisms, and that performs, in two stages, projection of a molded article 10 having an undercut portion. The injection molding die 1 opens in the up-down direction. The injection molding die 1 includes: a fixed-side die 12 having a cavity 14 which provides a molding face; and a movable-side die 21 having a core 31 which provides a molding face. The movable-side die 21 includes: a movable-side backing plate 32 in which the core 31 is formed; a movable-side mounting plate 33 for mounting the movable-side die 21 to a clamping mechanism-side die plate (not shown) of an injection molding machine; and a spacer block 34 provided between the movable-side backing plate 32 and the movable-side mounting plate 33 and for ensuing a movable range of the projection mechanisms.

The movable-side die 21 further includes an undercut processing mechanism 35. Here, an undercut is an inner undercut. The undercut processing mechanism 35 includes: a molding piece 36 configured to mold an undercut; an undercut molding unit 38 having an inclined pin 37 and configured to move the molding piece 36 in a direction perpendicular to a projection direction; and a fixing plate 39 configured to fix the undercut molding unit 38 to the movable-side backing plate 32. The molding piece 36 is pushed up by the second projection mechanism 41 described later.

The movable-side die 21 further includes a first projection mechanism 70 for projecting the molded article 10. The first projection mechanism 70 has an ejector plate 72; and an ejector pin 71 fixed to the ejector plate 72 for projecting the molded article 10. An ejector rod 85 for transmitting, to the ejector plate 72, projection power applied through a projection device (not shown) of the injection molding machine is fixed to the ejector plate 72 by a bolt. A return pin 87 is fixed to the ejector plate 72. The return pin 87 is inserted in a compression coil spring 86 and is configured to return the ejector plate 72 to the position before the projection.

The ejector plate 72 is composed of an upper ejector plate 72b and a lower ejector plate 72a that are fixed together by a bolt to constitute one ejector plate. The ejector plate 72 has a spot facing-type plate structure, sandwiches the flanges at the bottoms of the return pin 87 and the ejector pin 71 for projecting the molded article 10, and fixes these flanges.

The second projection mechanism 41 is configured to project (push up) the molding piece 36 of the undercut processing mechanism 35. The second projection mechanism 41 includes: a projection pin 45 configured to push up the molding piece 36; the lower spring 51 and the upper spring 55 configured to energize the projection pin 45 in the projection direction; and the stopper 58 configured to prevent lowering of the projection pin 45. In the present embodiment, the lower spring 51 corresponds to the first spring, and the upper spring 55 corresponds to the second spring.

The projection pin 45 includes: at the bottom thereof, a flange (lower flange) 47 having a disk shape with a diameter greater than the diameter of a pin body 46; and also at an intermediate portion thereof, a flange (upper flange) 48. The lower flange 47 functions as a stopper, against the ejector plate 72, of the projection pin 45. The upper flange 48 functions as a suppressor for the upper spring 55. The position of the upper flange 48 is set such that the travel (stroke) of the projection pin 45 is rendered to occupy (be) a height L1 which is necessary for moving the molding piece 36 to release the undercut. Thus, if the upper end of the upper flange 48 comes into contact with the fixing plate 39 or the movable-side backing plate 32, projection cannot be performed any further. That is, the upper flange 48 functions as travel restriction member which restricts the travel of the projection pin 45.

The lower flange 47 may be fixed to the pin body 46 by a bolt or the like, or may be formed integrally with the pin body 46. This also applies to the upper flange 48. If the position of the upper flange 48 relative to the pin body 46 is changeable, an initial reaction force $F2_0$ of the upper spring 55 can be easily adjusted.

In the present embodiment, the upper flange 48 functions also as a travel restriction member which restricts the travel (amount of movement, stroke) of the projection pin 45. However, the travel restriction member to restrict the travel of the projection pin 45 may be provided separately from the upper flange 48. FIG. 3 is a modification of the injection molding die 1, and the projection pin 45 includes, further above the upper flange 48, a stopper 49 serving as the travel restriction member. The stopper 49 may also be fixed to the pin body 46 by a bolt or the like, or may be formed integrally with the pin body 46.

A stepped through-hole 76 for attaching the projection pin 45 is provided in the ejector plate 72. As shown in FIG. 2, the stepped through-hole 76 is composed of: a through-hole 77 through which the pin body 46 can be inserted and through which the lower flange 47 cannot pass through; and an enlarged portion 78 (enlarged hole) extending from a center portion of the through-hole 77 to a lower portion of the stepped through-hole 76. The upper end of the enlarged portion 78 serves as a step portion 79. With respect to the projection pin 45, the pin body 46 is inserted in the stepped through-hole 76 such that the lower flange 47 is located in the enlarged portion 78 and the upper flange 48 is located above the upper ejector plate 72b.

The lower spring 51 is a compression coil spring which energizes the projection pin 45 in the projection direction, and is provided so as to push up the lower flange 47 of the projection pin 45. Specifically, the stopper 58 mounted to the movable-side mounting plate 33 is inserted in the lower spring 51 as a guide such that the lower spring 51 is extendable and contractible. In a die clamping state of the injection molding die 1, the lower spring 51 is in a compressed state where the lower end thereof is in contact with the movable-side mounting plate 33 and the upper end thereof is in contact with the lower flange 47, and the reaction force thereof is $F1_0$ (see FIGS. 9A and 9B).

The upper spring 55 is also a compression coil spring which energizes the projection pin 45 in the projection direction, and is provided so as to push up the upper flange 48 of the projection pin 45. Specifically, the pin body 46 is inserted in the upper spring 55 such that the upper spring 55 is extendable and contractible between the upper flange 48 and an upper face 74 of the ejector plate 72. When compressed by the ejector plate 72, the upper spring 55 increases a reaction force F2, and energizes the projection pin 45 so as to further push up the projection pin 45. Details of strength (reaction force), action, and energization force of each of the lower spring 51 and the upper spring 55 will be described later in relation with the operation of the injection molding die 1 during projection of a molded article and action of the projection mechanisms.

The stopper 58 is a round bar member located on the central axis of the projection pin 45, and is fixed to the movable-side mounting plate 33 such that the upper end of the stopper 58 is at the lower flange 47 side. The length of the stopper 58 is set to a length that allows the bottom face of the lower flange 47 to come into contact with the upper end of the stopper 58 in the die clamping state of the injection molding die 1 (see FIG. 2). By this configuration, the stopper 58 can support the projection pin 45 such that the molding piece 36 is not pushed down in the die clamping state of the injection molding die 1, especially, due to pressure of resin during injection.

The stopper 58 also functions as an attachment tool for attaching the lower spring 51 to the movable-side die 21, and further, as a guide which holds the lower spring 51 at the central axis of the projection pin 45 so as to prevent the lower spring 51 from falling. The injection molding die 1 of the present embodiment opens in the up-down direction, and thus, the lower spring 51 is less likely to fall. However, in a case of a die that opens in the horizontal direction, if no guide is provided, it is difficult to keep the lower spring 51 horizontally, and further, there is a risk that the lower spring 51 drops. In addition, assembling of the lower spring 51 to the die becomes difficult. In consideration of these circumstances, preferably, the outer diameter of the stopper 58 is slightly smaller than the inner diameter of the lower spring 51 such that the lower spring 51 can be stably set with the stopper 58 inserted therein.

Next, operation of the injection molding die 1 during projection of a molded article and action of the projection mechanisms are described. First, a case where the undercut processing mechanism 35 operates normally is described, and then, a case where the molding piece 36 is trapped by another member in the middle of projection is described. FIG. 9A shows the case where the undercut processing mechanism 35 operates normally, and FIG. 9B shows the case where the molding piece 36 is trapped by another member in the middle of projection. FIG. 8 and FIG. 9B are expressed in exaggeration so as to facilitate understanding.

After an injection step and a cooling step, the injection molding die 1 opens, and the procedure shifts to a step of projecting the molded article 10. In the injection step, the injection molding die 1 is in a state shown in FIG. 1. At this time, the leading end of the projection pin 45 is in contact with the undercut molding unit 38, and the lower flange 47 is in contact with the leading end of the stopper 58. Thus, even if pressure of resin that could push down the molding piece 36, the projection pin 45, and the like is applied thereto in association with injection, the positions of the molding piece 36, the projection pin 45, and the like are not lowered.

After the cooling step, the injection molding die 1 is opened by the movable-side die 21 being retracted via a die clamping device (not shown), whereby a space for taking out the molded article 10 is provided between the fixed-side die 12 and the movable-side die 21. At this time, the lower spring 51 is in a compressed state and the reaction force thereof is $F1_0$, and the upper spring 55 is also in a compressed state and the reaction force thereof is $F2_0$ (see FIG. 9A). Although a reaction force $F1_0$ of the lower spring 51 and the reaction force $F2_0$ of the upper spring 55 act on the projection pin 45, the projection pin 45 cannot ascend because the lower flange 47 is trapped by the step portion 79.

When the procedure shifts to the projection step, the ejector rod 85 advances by receiving power from the projection device (not shown) of the injection molding machine, and the ejector plate 72 coupled to the ejector rod 85 ascends. By this configuration, the fixed ejector pin 71 also moves in the projection direction to push up the molded article 10 (see FIG. 5). When the ejector plate 72 ascends, the lower spring 51 also expands in association therewith. When the ejector plate 72 has moved to Point A, the reaction force of the lower spring 51 acting on the projection pin 45 is $F1_A$ (see FIG. 9A).

Also in this stage, the projection pin 45 cannot ascend any further because the lower flange 47 is still trapped by the step portion 79, and the ejector plate 72 and the projection pin 45 ascend integrally with each other. As long as the ejector plate 72 and the projection pin 45 ascend integrally with each other, the upper spring 55 is neither expanded nor compressed, and thus, the reaction force thereof is still maintained to be $F2_0$ (see FIG. 9A). When the ejector plate 72 has moved to Point A, the force acting so as to push up the projection pin 45 is a reaction force $F1_A$ of the lower spring 51, and a reaction force $F2_A = F2_0$ of the upper spring 55.

When the ejector plate 72 is projected by the height L1, the upper flange 48 of the projection pin 45 comes into contact with the fixing plate 39, whereby ascending of the projection pin 45 is stopped. FIG. 6 shows a state where the upper flange 48 is in contact with the fixing plate 39. At this time, the molding piece 36 moves leftward, thereby establishing a state where the undercut is released. At this time, the projection pin 45 has been pushed up by the reaction force $F1_1$ of the lower spring 51 and the reaction force $F2_0$ of the upper spring 55 (see FIG. 9A).

When the upper flange 48 has come into contact with the fixing plate 39, the projection pin 45 stops ascending, but the ejector plate 72 continues ascending. Since the projection pin 45 does not move, the reaction force of the lower spring 51 is kept at $F1_1$. On the other hand, as a result of the interval between the fixing plate 39 and the upper face 74 of the ejector plate 72 being reduced, the upper spring 55 is significantly compressed and the reaction force F2 increases (see FIG. 9A).

Although the upper spring 55 having the increased reaction force F2 acts so as to push up the projection pin 45 and so as to push down the ejector plate 72, the projection pin 45 cannot ascend since the upper flange 48 is in contact with the fixing plate 39, and the ejector plate 72 is not pushed down since the ejector plate 72 is supported by the projection device of the injection molding machine.

The height of the ejector plate 72 pushed up to the maximum level is the height of L1+L2 from the initial position thereof. The ejector pin 71 fixed to the ejector plate 72 also moves by the height of L1+L2 from the initial position thereof, and projects the molded article 10. FIG. 7 shows a state in which the ejector pin 71 has been pushed up to the maximum level.

When the molded article 10 has been pushed out, the procedure shifts to a die clamping step. When the procedure has shifted to the die clamping step, the projection device (not shown) of the injection molding machine retracts from the side of movable-side backing plate 32 to the side of movable-side mounting plate 33. The ejector plate 72 no longer receiving the projection power from the projection device of the injection molding machine retracts from the movable-side backing plate 32 side to the movable-side mounting plate 33 side due to the reaction forces of the compression coil spring 86 and the upper spring 55. When the ejector plate 72 retracts by the height L2 from the maximum projection position thereof, the step portion 79 comes into contact with the lower flange 47 of the projection pin 45.

Thereafter, the projection pin 45 descends integrally with the ejector plate 72, and, in the end, the leading end of the return pin 87 comes into contact with the fixed-side die 12, and the ejector plate 72 is pushed to the initial position where the ejector plate 72 has not been ejected. By this configuration, the lower spring 51 is also compressed to the state of the reaction force $F1_0$. After the ejector plate 72 has retracted by the height L2 from the maximum projection position thereof and the step portion 79 has come into contact with the lower flange 47 of the projection pin 45, the reaction force of the upper spring 55 becomes $F2_0$.

As described above, during an early stage of projection, the second projection mechanism 41 can effectively use the reaction force of the lower spring 51 in a compressed state. In association with projection operation, the lower spring 51 expands and the reaction force thereof is reduced. However, since the reaction force of the upper spring 55 is also added, high projection force can be maintained even at a final stage of the projection. Thus, the injection molding die 1 can reliably perform releasing of an undercut and projection of a product, compared with a conventional injection molding die including a projection mechanism that uses only the lower spring 51 or only the upper spring 55.

The magnitudes of the reaction forces of the lower spring 51 and the upper spring 55 are not limited in particular, and may be determined as appropriate in accordance with the undercut processing mechanism 35 which is subjected to projection. In the present projection mechanism, the lower spring 51 and the upper spring 55 provided at opposite sides with respect to the ejector plate 72 cooperate with each other to project the projection pin 45. Thus, as the lower spring 51 and the upper spring 55, those having relatively small reaction forces can be used. When projection operation and action of the second projection mechanism 41 are taken into consideration, the upper spring 55 that has a reaction force smaller than that of the lower spring 51 can be used.

Next, a case where the molding piece 36 is trapped by another member in the middle of projection is described. As shown in FIG. 8, it is assumed that the molding piece 36 is trapped by another member when the ejector plate 72 has ascended by a travel A. At this time, the reaction force $F1_A$ of the lower spring 51 and the reaction force $F2_A = F2_0$ of the upper spring 55 are applied to the projection pin 45. It is assumed that these reaction forces are not sufficient to release the trapped state (see FIG. 9B).

If projection operation is continued from this state, only the ejector plate 72 ascends. At the time when the ejector plate 72 has reached Point B, the reaction force of the lower spring 51 is $F1_A$. On the other hand, the upper spring 55 is compressed by ΔL (see FIG. 8) by the ejector plate 72, and the reaction force increases from $F2_A$ to $F2_B$. Accordingly, the trapped state of the molding piece 36 is released.

When the trapped state of the molding piece 36 is released at Point B, the projection pin 45 ascends by ΔL, the lower flange 47 is trapped by the step portion 79, the reaction force of the lower spring 51 becomes $F1_B$, and the reaction force of the upper spring 55 returns to $F2_0$. Thereafter, the operation of the injection molding die 1 becomes the same as the operation performed when the undercut processing mechanism 35 operates normally. As described above, in a case where the molding piece 36 is trapped by another member in the middle of projection, the upper spring 55 immediately increases the reaction force thereof, thereby projecting the projection pin 45.

As described above, the injection molding die 1 according to the present embodiment includes: the first projection mechanism 70 utilizing the ejector plate 72 as a drive source;

and the second projection mechanism 41 utilizing the lower spring 51 and the upper spring 55 as a drive source, and can cause the projection mechanisms to move independently of each other. Thus, even a molded article having a complicated undercut portion can be reliably released from the die. In addition, components of complicated structure and large number of components are not required in both the first projection mechanism 70 and the second projection mechanism 41, resulting in simple structures which are assembled easily. Therefore, the injection molding die 1 can be produced in a compact size and inexpensively.

In a case of a conventional molding die in which an undercut is released by a projection mechanism utilizing a spring as a drive source, if an undercut molding core or an ejector pin used for projecting the undercut molding core is trapped by another member, it is difficult to eliminate the trapped state. In the injection molding die 1, even if the molding piece 36 or the inclined pin 37 is trapped by another member, the upper spring 55 energizes the projection pin 45 so as further project the projection pin 45. Thus, the trapped state can be released and the molded article can be reliably released from the die.

Since the projection of the projection pin 45 is assisted by the upper spring 55 in the second projection mechanism 41, an extremely large spring is not required as the lower spring 51. Also, a large spring is not required as the upper spring 55. Thus, it is possible to downsize the projection mechanisms of the injection molding die 1, the fixed-side die 12 and/or the movable-side die 21, and further, the injection molding die 1.

In the injection molding die 1, the stopper 58 functions as an attachment tool and a guide for the lower spring 51 and holds the lower spring 51 in a predetermined attitude at a predetermined position, which facilitates incorporation thereof into the molding die. Also in a case of a molding die that opens in the horizontal direction, dropping or tilting of the lower spring 51 can be prevented, and thus, the molded article can be reliably released from the die.

Since the stopper 58 functions as a stopper that prevents the projection pin 45 from moving in the die clamping state, even if a large load of resin is applied to the projection pin 45 during injection molding, the projection pin 45 does not move, and thus, poor molding can be reliably prevented.

Figure 10:
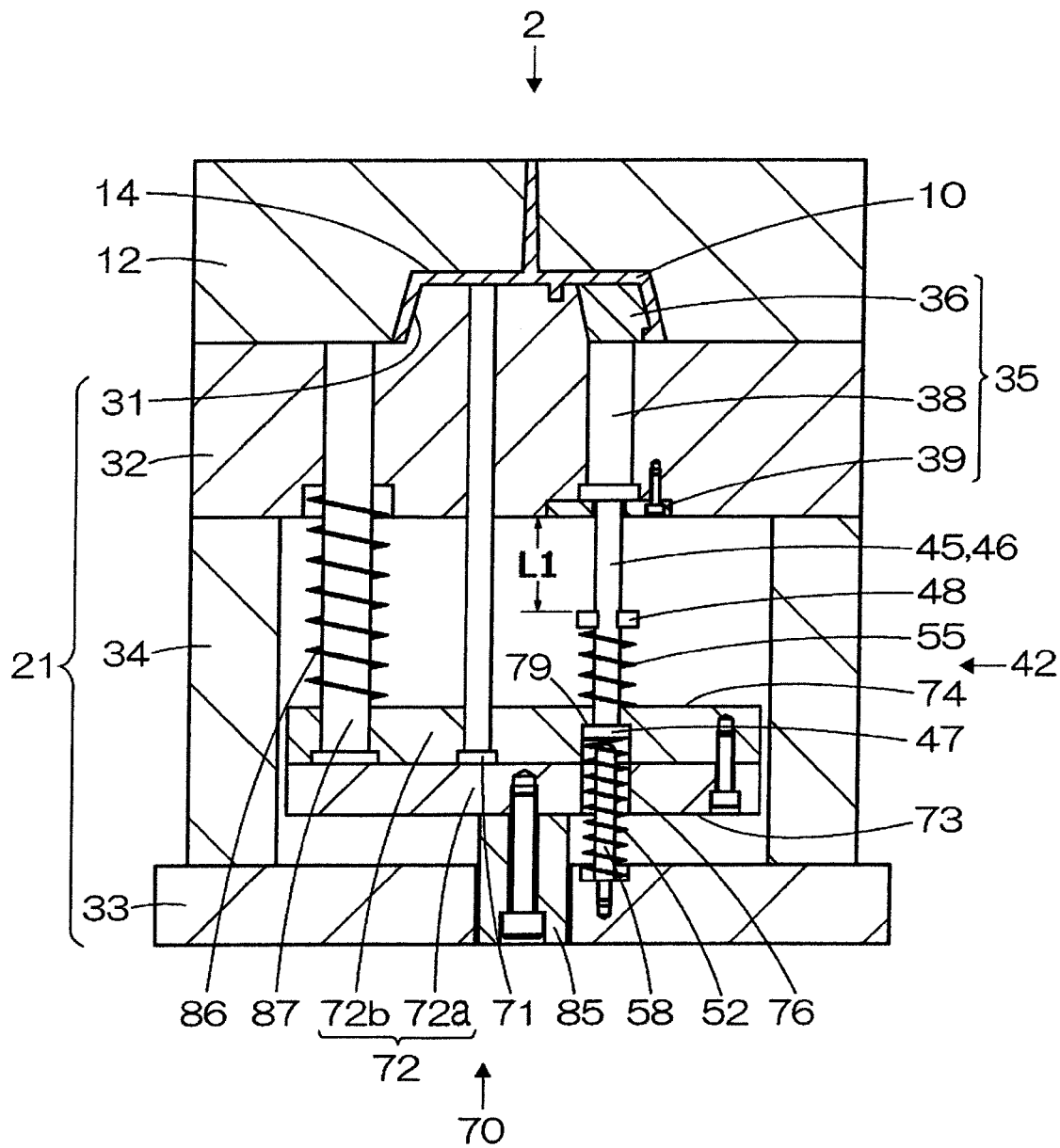
FIG. 10 is a cross-sectional view of a main part of an injection molding die 2 according to a second embodiment of the present invention.
Figure 11:
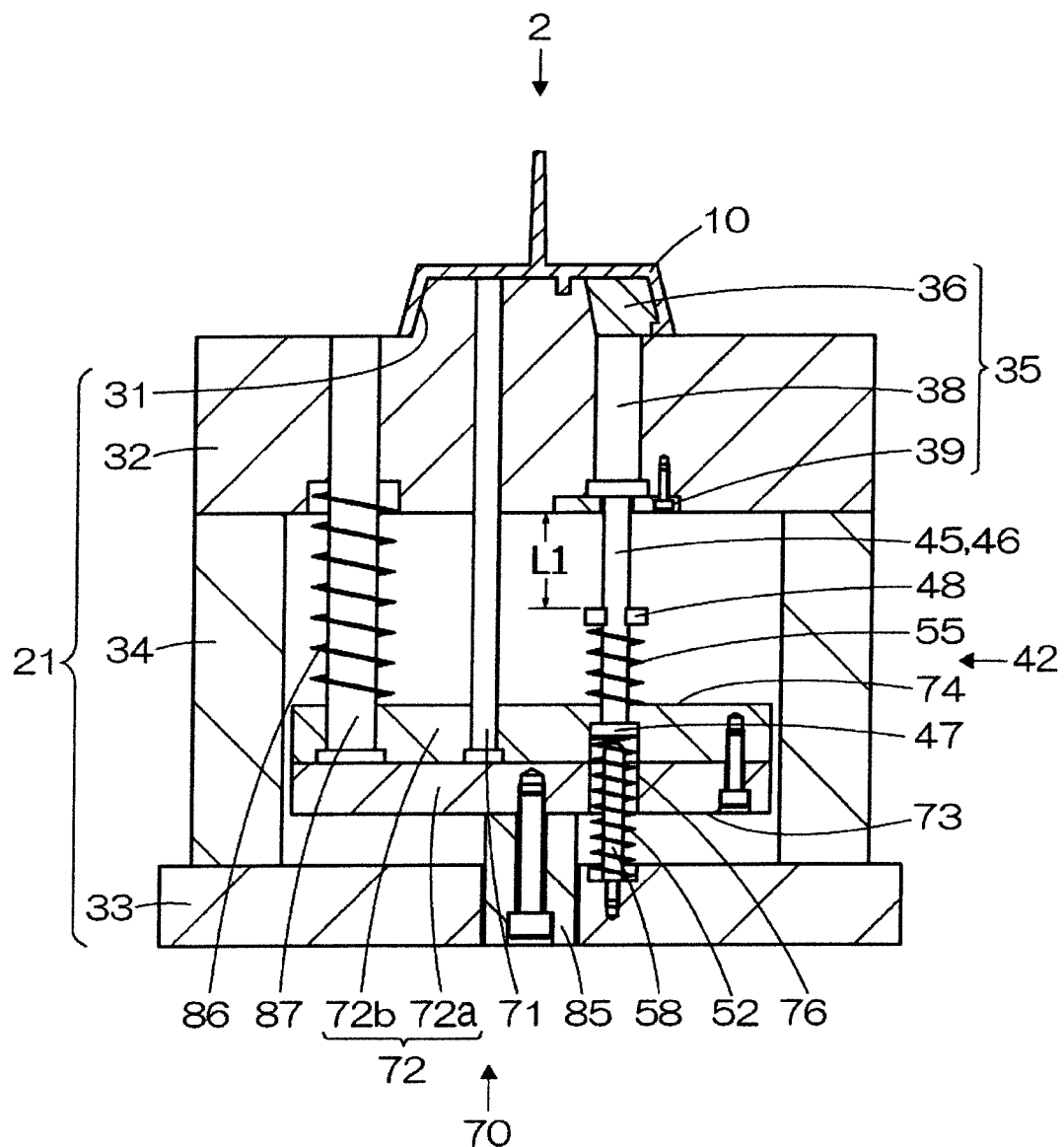
FIG. 11 is a cross-sectional view of a main part showing a state of the injection molding die 2 in FIG. 10 which is opened.
Figure 12:
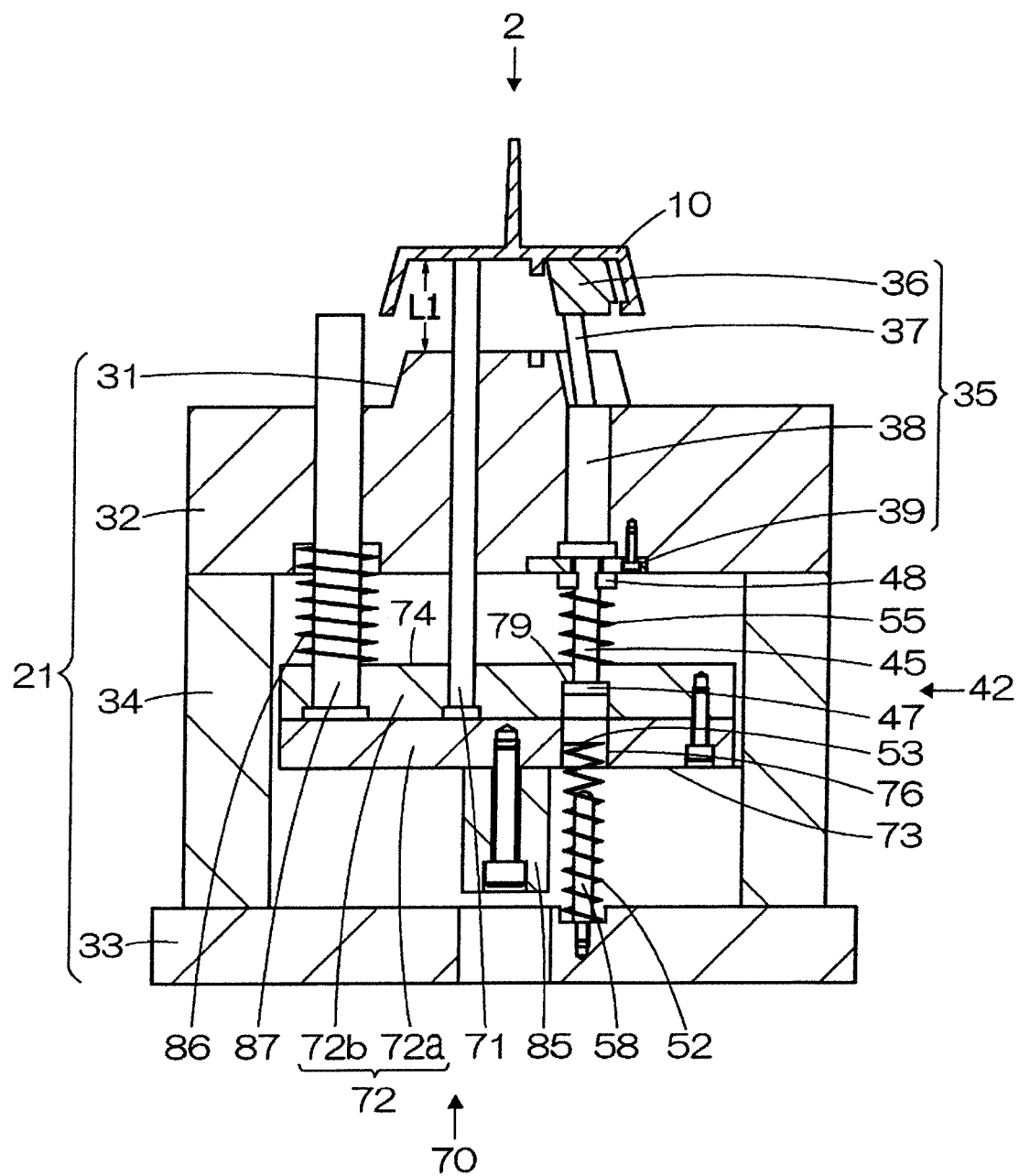
FIG. 12 is a cross-sectional view of a main part showing a state of the injection molding die 2 in FIG. 10 during projection of a molded article.
Figure 13:
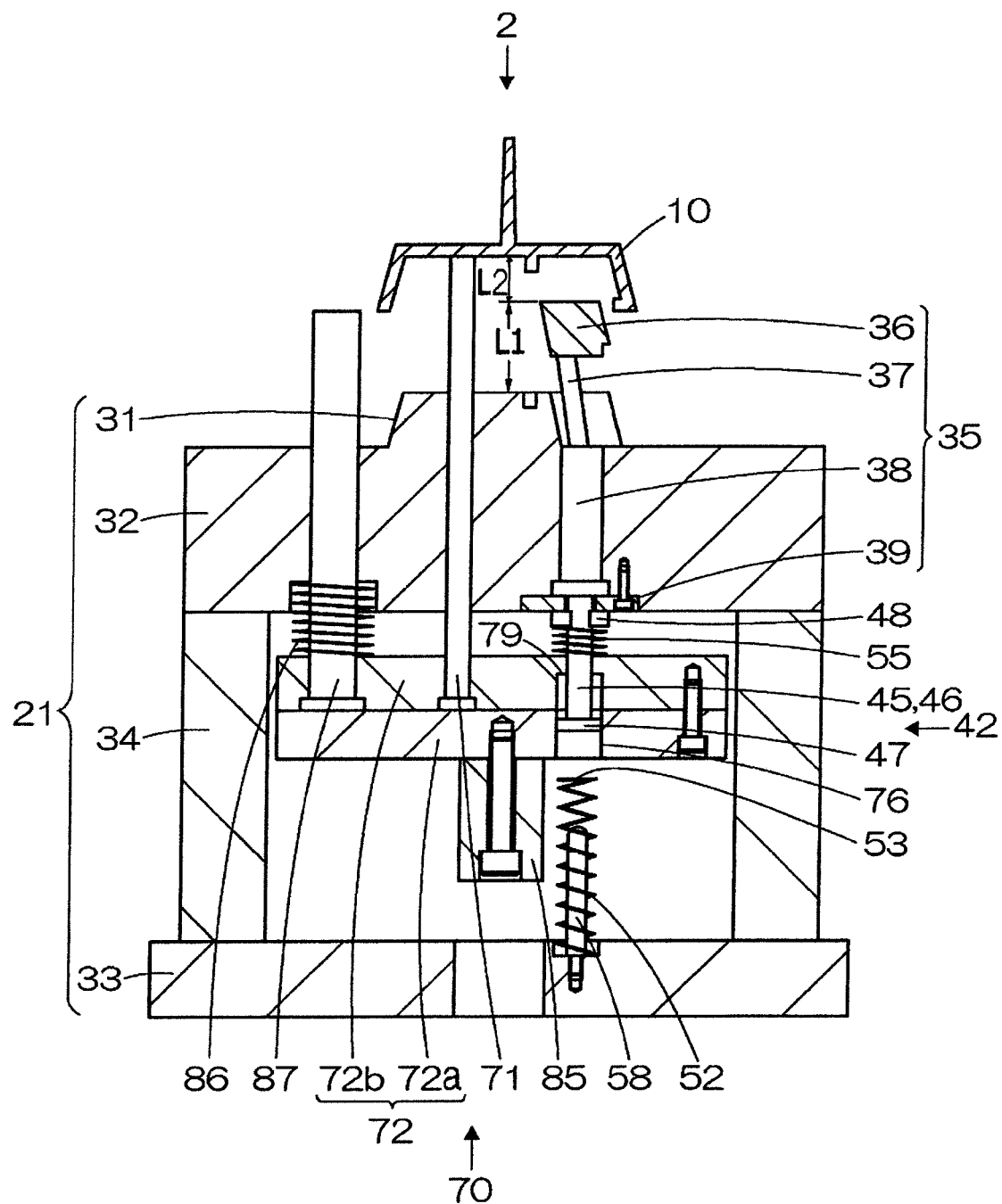
FIG. 13 is a cross-sectional view of a main part showing a state of the injection molding die 2 in FIG. 10 during projection of a molded article.
Figure 14:
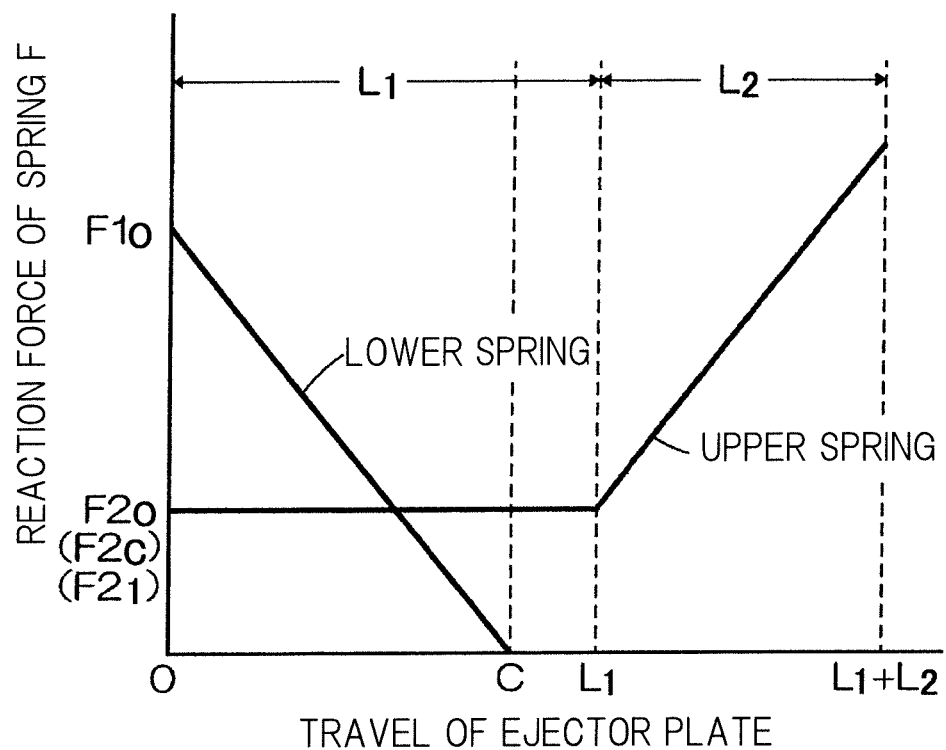
FIG. 14 is a diagram for describing reaction forces of a lower spring 52 and the upper spring 55 used in a second projection mechanism 42 of the injection molding die 2 shown in FIG. 10.

FIG. 10 is a cross-sectional view of a main part of an injection molding die 2 according to a second embodiment of the present invention. FIG. 11 is a cross-sectional view of a main part showing a state of the injection molding die 2 which is opened. FIG. 12 and FIG. 13 are each a cross-sectional view of a main part showing a state of the injection molding die 2 during projection of a molded article. FIG. 14 is a diagram for describing reaction forces of a lower spring 52 and the upper spring 55 used in a second projection mechanism 42 of the injection molding die 2. In the present embodiment, "up" and "upward direction" mean "up" and "upward direction" in the drawings, respectively, and in FIG. 10, the direction toward the fixed-side die 12 corresponds to the "up" and "upward direction". It should be noted that the same components as those in the injection molding die 1 of the first embodiment shown in FIG. 1 to FIG. 8 are denoted by the same reference numerals, respectively, and description thereof is omitted.

The injection molding die 2 according to the second embodiment is the same as the injection molding die 1 according to the first embodiment, except that the length of the lower spring 52 for projecting the projection pin 45 is smaller than the length of the lower spring 51 of the injection molding die 1 according to the first embodiment. The movement of the injection molding die 2, and the operation, action, effect of the second projection mechanism 42 are basically the same as those of the injection molding die 1 and the second projection mechanism 41 according to the first embodiment.

The lower spring 51 used in the second projection mechanism 41 of the first embodiment is in contact with the lower flange 47 and acts so as to project the projection pin 45 even at the time when the ejector plate 72 has ascended by L1 (see FIG. 6, and FIGS. 9A and 9B). In contrast to this configuration, since the lower spring 52 used in the second projection mechanism 42 of the second embodiment has small length, the upper end of the lower spring 52 is detached from the lower flange 47 at the time when the ejector plate 72 has ascended to Point C (C<L1). Thereafter, the lower spring 52 does not act on the projection of the projection pin 45. While the ejector plate 72 ascends from Point C to L1, only the upper spring 55 projects the projection pin 45 at reaction force $F2_C = F2_0$ (see FIG. 14).

In the projection mechanism in which the lower spring 52 and the upper spring 55 are arranged so as to have the ejector plate 72 interposed therebetween, and in which the projection pin 45 is projected by the reaction forces thereof, as long as a necessary projection force is ensured by the upper spring 55, there is no problem even if the projection force by the lower spring 52 becomes zero in the middle of the projection process.

In the second projection mechanism 42, while the ejector plate 72 ascends from Point C to L1, the upper spring 55 is required to project the projection pin 45 without support by the additional force. Thus, as the upper spring 55 used in the second projection mechanism 42, it is necessary to use a spring that has a larger reaction force than the upper spring 55 used in the second projection mechanism 41 of the first embodiment. In the second projection mechanism 42, if the molding piece 36 is trapped by another member in the middle of projection, the trapped state is released by the same operation and action as those in the second projection mechanism 41 of the first embodiment.

In the present embodiment, since the length of the lower spring 52 is small, when the ejector plate 72 is projected to the maximum, an upper end 53 of the lower spring 52 is located outside the stepped through-hole 76 (see FIG. 13). Even in such a case, it is important that the lower spring 52 is held in an attitude that is straight and on the axis of the projection pin 45. If the lower spring 52 tilts, the lower spring 52 cannot be fitted in the stepped through-hole 76 during the die clamping step. Thus, preferably, the gap between the inner side of the lower spring 52 and the outer side of the stopper 58 is as small as possible.

Figure 15:
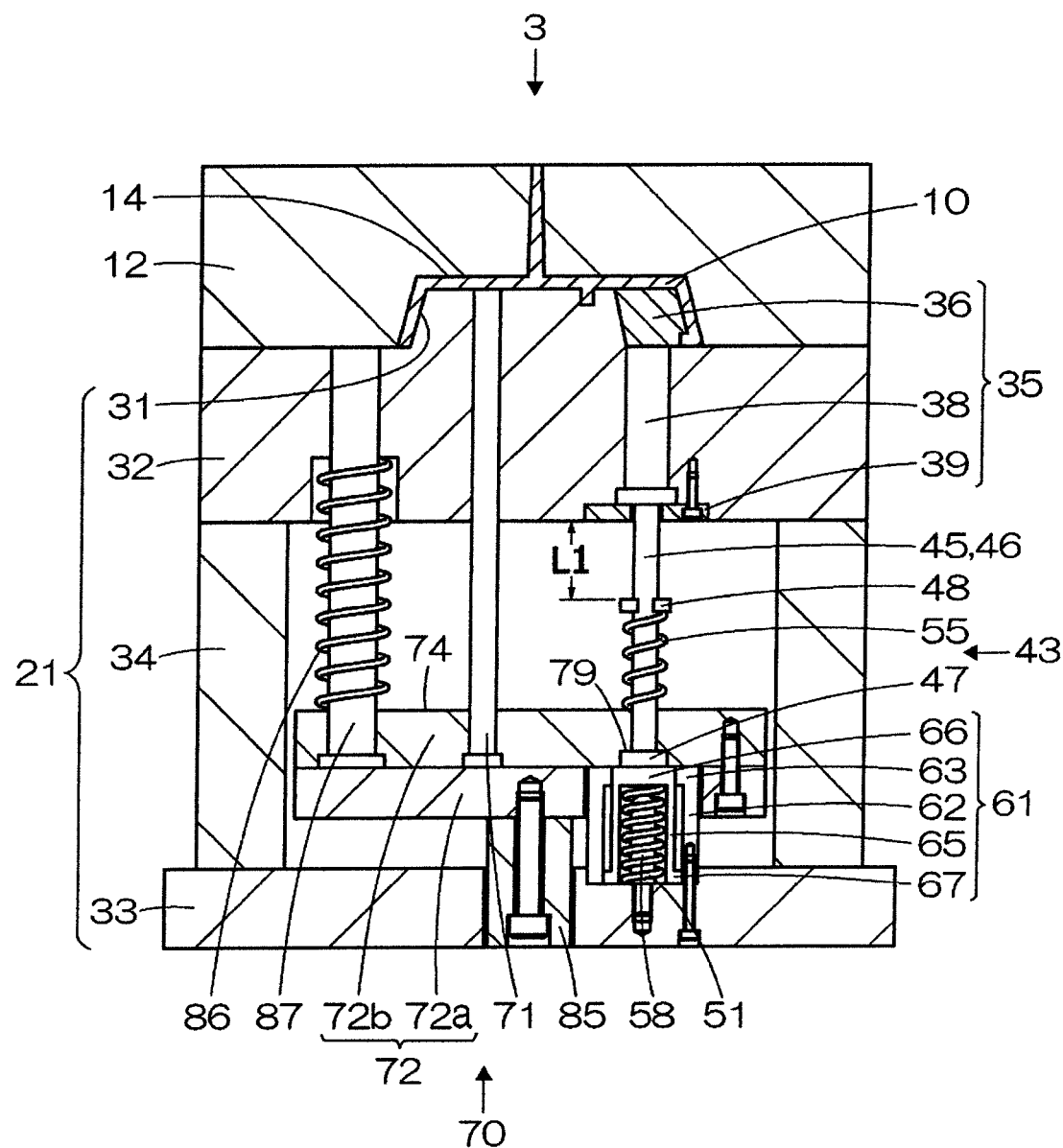
FIG. 15 is a cross-sectional view of a main part of an injection molding die 3 according to a third embodiment of the present invention.
Figure 16:
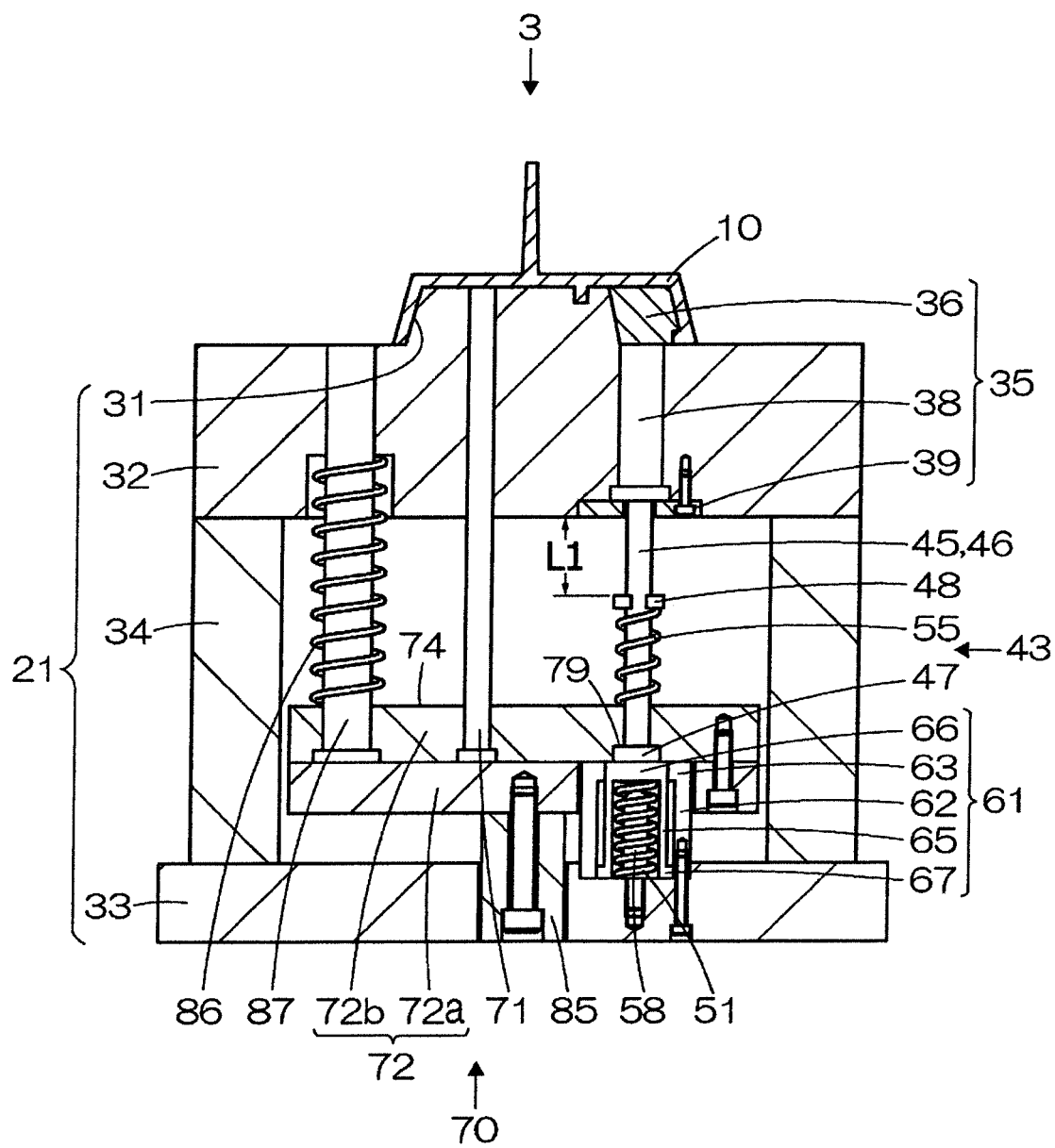
FIG. 16 is a cross-sectional view of a main part showing a state of the injection molding die 3 in FIG. 15 which is opened.
Figure 17:
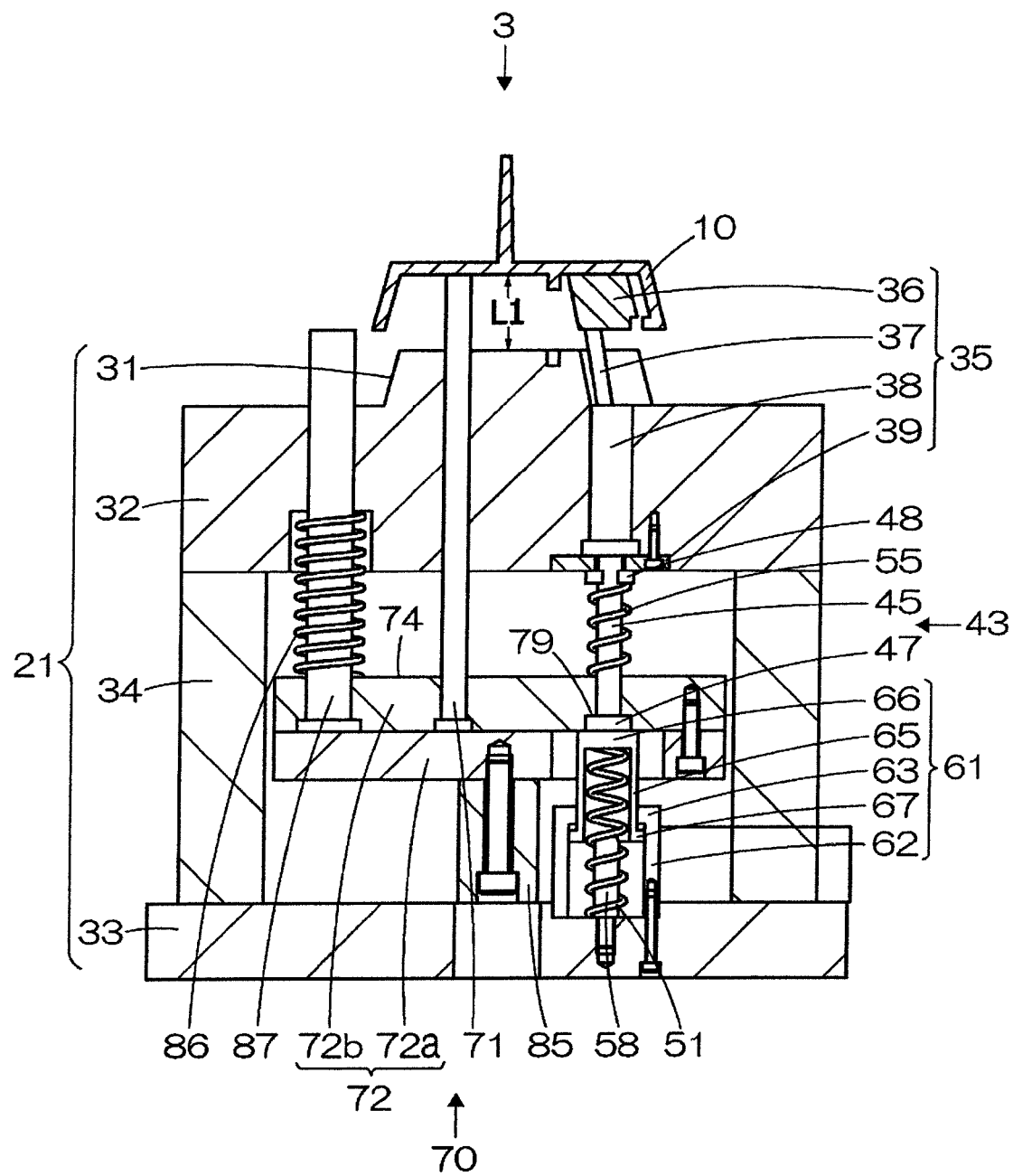
FIG. 17 is a cross-sectional view of a main part showing a state of the injection molding die 3 in FIG. 15 during projection of a molded article.
Figure 18:
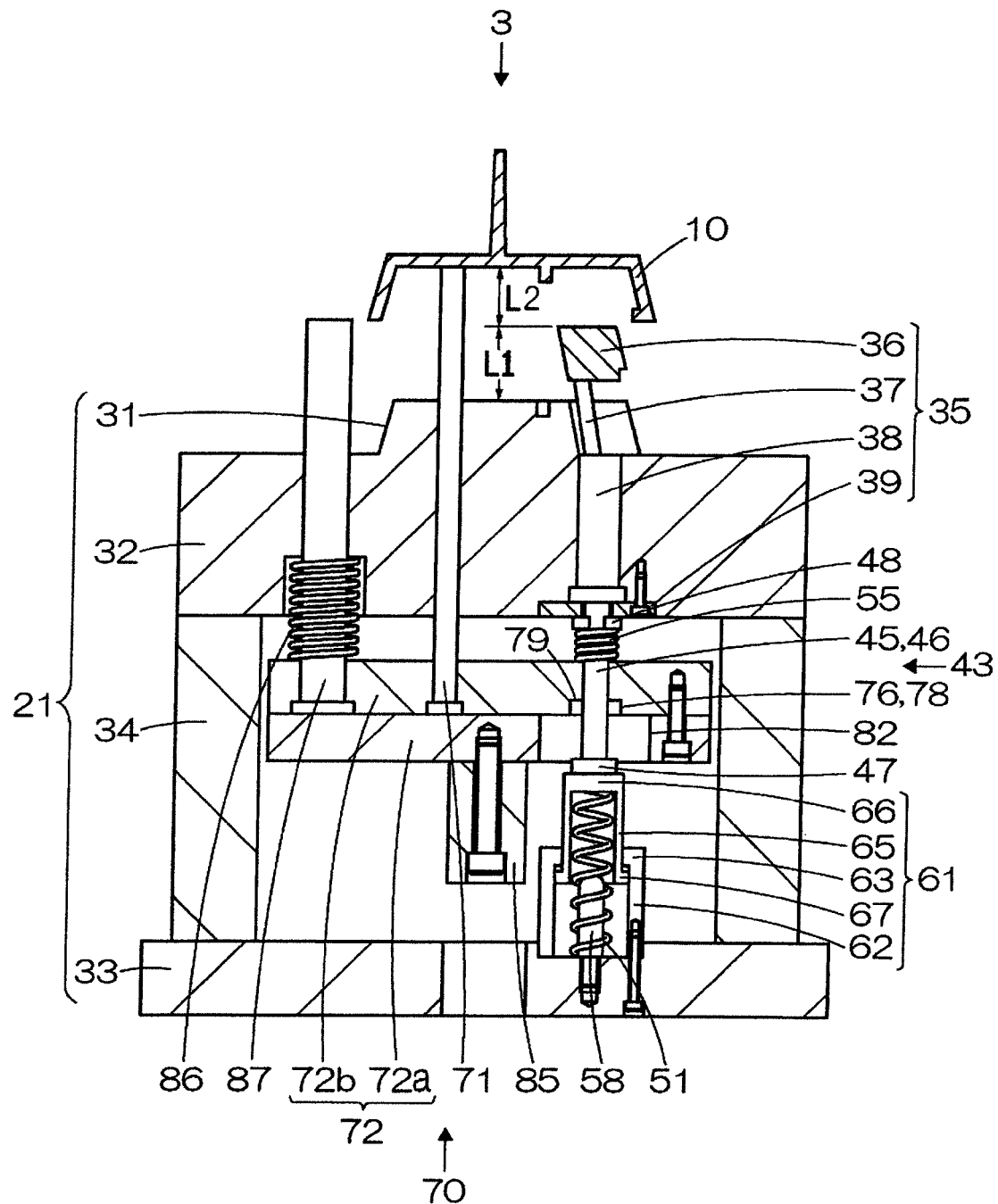
FIG. 18 is a cross-sectional view of a main part showing a state of the injection molding die 3 in FIG. 15 during projection of a molded article.

FIG. 15 is a cross-sectional view of a main part of an injection molding die 3 according to a third embodiment of the present invention. FIG. 16 is a cross-sectional view of a main part showing a state of the injection molding die 3 which is opened. FIG. 17 and FIG. 18 are each a cross-sectional view of a main part showing a state of the injection molding die 3 during projection of a molded article. In the present embodiment, "up" and "upward direction" mean "up" and "upward direction" in the drawings, respectively, and in FIG. 15, the direction toward the fixed-side die 12 corresponds to the "up" and "upward direction". It should be noted that the same components as those in the injection molding die 1 of the first embodiment shown in FIG. 1 to FIG. 8 are denoted by the same reference numerals, respectively, and description thereof is omitted.

Configuration of the injection molding die 3 according to the third embodiment is the same as the injection molding die 1 according to the first embodiment, except for the attachment manner of the lower spring 51 of the second projection mechanism to the die. The movement of the injection molding die 3, and the operation, action, effect of a second projection mechanism 43 are basically the same as those of the injection molding die 1 and the second projection mechanism 41 according to the first embodiment.

In the second projection mechanism 41 of the first embodiment, the stopper 58 is also used as an attachment tool for attaching the lower spring 51 to the die, thereby keeping the position and attitude of the lower spring 51. In contrast to this configuration, in the second projection mechanism 43 of the third embodiment, a holder 61 is used to attach the lower spring 51 to the die and to keep the position and attitude of the lower spring 51.

The holder 61 includes: an outer holder 62 mounted to the movable-side mounting plate 33; and an inner holder 65 located inside the outer holder 62 and slidably engaged with the outer holder 62.

The outer holder 62 is a cylindrical member that has am ceiling portion and an open bottom. The outer holder 62 has the stopper 58 disposed at the center thereof, and is fixed to the movable-side mounting plate 33 by a bolt so as to surround the stopper 58. A through-hole that allows the inner holder 65 to slide in a freely movable manner is provided in a ceiling portion 63. The diameter of this through-hole is smaller than the inner diameter of the outer holder 62, and a flange is formed in the ceiling portion. An opening (not shown), e.g., a slit, through which the lower spring 51 in the inner holder 65 is visible is provided in the outer holder 62. The size, the shape, and the number of this opening are not limited in particular as long as strength necessary for the outer holder 62 is ensured.

The inner holder 65 is a cylindrical member that has an open bottom and a closed ceiling portion 66, and at the lower end of the inner holder 65, a flange 67 having a disk-like shape is provided. The flange 67 prevents the inner holder 65 from slipping off from the outer holder 62. The inner holder 65 has an inner diameter that is slightly greater than the outer diameter of the lower spring 51 and is in a size that allows the lower spring 51 to be housed in the inner holder 65. The outer diameter of the flange 67 is substantially the same as the inner diameter of the outer holder 62, and the outer holder 62 is in a size that allows the inner holder 65 to be completely housed therein.

Like as the case of the outer holder 62, an opening (not shown), e.g., a slit, that allows viewing of the lower spring 51 in the inner holder 65 is provided in the inner holder 65. The size, the shape, and the number of this opening are not limited in particular as long as strength necessary for the inner holder 65 is ensured. Even when the lower spring 51 is damaged, the damage can be found easily since the openings that allow viewing of the lower spring 51 are provided in the outer holder 62 and the inner holder 65.

In the ejector plate 72, a recessed portion 82 in which the outer holder 62 is fitted is provided coaxially with the stepped through-hole 76. The stepped through-hole 76 is provided in the upper ejector plate 72*b*, and the enlarged portion 78 is provided such that the bottom of the lower flange 47 is flush with the bottom of the upper ejector plate 72*b* in the die clamping state. The recessed portion 82 is provided so as to penetrate the lower ejector plate 72*a*.

The lower spring 51 has the stopper 58 inserted therein, and is mounted to the movable-side mounting plate 33 in such a manner that the lower spring 51 is covered by the holder 61. In the die clamping state, the lower flange 47 of the projection pin 45 is in contact with the upper face of the ceiling portion 66 of the inner holder 65, and the lower end of the inner holder 65 is in contact with the movable-side mounting plate 33. Further, in the die clamping state, the upper end of the stopper 58 is in contact with the lower face of the ceiling portion 66 of the inner holder 65. Thus, even if pressure of resin that could push down the molding piece 36, the projection pin 45, and the like is applied thereto in association with injection, the positions of the molding piece 36, the projection pin 45, and the like are not lowered.

In the present embodiment, the outer holder 62 is formed such that the upper end thereof comes into contact with the upper ejector plate 72*b* in the die clamping state, but this is not an essential requirement. As described above, in the die clamping state, the inner holder 65 and the stopper 58 both prevent lowering of the positions of the molding piece 36, the projection pin 45, and the like. However, the lowering of the positions of the molding piece 36, the projection pin 45, and the like may be prevented by either the inner holder 65 or the stopper 58. That is, if the inner holder 65 functions also as a stopper, the stopper 58 may not be provided. On the other hand, if the stopper 58 is provided, the inner holder 65 may not function as a stopper. In this case, the height of the inner holder 65 can be reduced compared with that in the present embodiment.

In the second projection mechanism 43 of the third embodiment, the lower spring 51 pushes up the inner holder 65, and the projection pin 45 is pushed up via the inner holder 65. As a result, in the projection step of the product, the inner holder 65 moves upward in association with expansion of the lower spring 51, but the operation and action of the lower spring 51 is the same as those in the second projection mechanism 41 of the first embodiment.

In the second projection mechanism 43 of the third embodiment, the lower spring 51 is mounted to the die in a state where the lower spring 51 is housed in the holder 61. Thus, mounting of the lower spring 51 to the die is facilitated, and further, the position and attitude of the lower spring 51 can be kept.

The molding die projection mechanism according to the present invention, and a movable-side die and a molding die including the projection mechanism are not limited to the embodiments above, and can be changed to be used as appropriate without departing from the gist of the present invention. In the second projection mechanisms 41, 42, 43 shown in the above-described embodiments, the lower spring 51, 52 and the upper spring 55 are provided so as to have the ejector plate 72 interposed therebetween. However, instead of the ejector plate 72, the lower spring 51, 52 and the upper spring 55 may be provided so as to have interposed therebetween a member that is attached to the ejector plate 72 and that moves integrally with the ejector plate 72, or a member that moves in synchronization with the ejector plate 72. In the above-described embodiments, the lower flange 47 is provided at the bottom of the projection pin 45, but the lower flange 47 may be a lower portion of the projection pin 45.

In the embodiments above, the core 31 is directly formed in the movable-side backing plate 32. However, a movable-side die plate may be provided and a core may be formed in the movable-side die plate, and further, the core may have a nested structure. In the present embodiment, the undercut is an inner undercut, but the undercut may be an outer undercut. Also, the undercut processing mechanism is not limited to the present configuration. In addition, the number of the ejector pins 71 fixed to the ejector plate 72 and configured to be projected is not limited in particular.

In the injection molding die 1 shown in the above-described embodiment, the second projection mechanism 41 including the projection pin 45, the lower spring 51, the upper spring 55, and the stopper 58 uses the reaction forces of the springs as a drive source and moves independently of the ejector plate 72. Thus, it becomes possible to provide a plurality of the second projection mechanisms 41 for one ejector plate 72, and by causing the stroke of each projection pin 45 to be different, it is easy to perform multi-stage projection. Even in such an injection molding die that performs multi-stage projection, the number of the ejector plate 72 is one, and thus, the die can be made compact. This also applies to the injection molding dies 2, 3 of the second and third embodiments.

The materials of the component members used in the molding die projection mechanism of the present invention and the fixed-side die, the movable-side die, and the molding die including the projection mechanism are not limited to specific materials, and materials similar to those of members used in known molding dies can be used as appropriate. However, for the sliding face in each component member, a material that has good sliding property or a surface-treated material having good sliding property is preferably used. Each sliding face is not limited to a sliding face for use in surface contact, but may be a sliding face for use in line contact or in point contact.

In the molding die of the present invention, an R-chamfering, a C-chamfering, or the like may be provided at corners or lateral edges of the component members.

The molding die of the present invention is not limited to a molding die that opens/closes in the up-down direction, and may be a molding die that opens/closes in a left-right direction or another direction.

Application of the molding die projection mechanism of the present invention, the fixed-side die, the movable-side die, and the molding die including the projection mechanism is not limited to the injection molding die. The molding die can be preferably used in compression molding die, a molding die of die casting, and the like.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS 1, 2, 3 . . . injection molding die
10 . . . molded article
12 . . . fixed-side die
21 . . . movable-side die
32 . . . movable-side backing plate
33 . . . movable-side mounting plate
35 . . . undercut processing mechanism
36 . . . molding piece
37 . . . inclined pin
38 . . . undercut molding unit
39 . . . fixing plate
41, 42, 43 . . . second projection mechanism
45 . . . projection pin
46 . . . pin body
47 . . . lower flange
48 . . . upper flange
49 . . . stopper
51, 52 . . . lower spring (first spring)
55 . . . upper spring (second spring)
58 . . . stopper
61 . . . holder
62 . . . outer holder
65 . . . inner holder
70 . . . first projection mechanism
71 . . . ejector pin
72 . . . ejector plate
73 . . . bottom of ejector plate
74 . . . upper face of ejector plate
76 . . . stepped through-hole
77 . . . through-hole
78 . . . enlarged portion
79 . . . step portion

What is claimed is:

1. A projection mechanism of a molding die configured to mold a molded article by a fixed-side die and a movable-side die, the projection mechanism comprising:
   a projection pin using a reaction force of a spring as a drive source; and
   a first spring and a second spring configured to project the projection pin,
   wherein
   the first spring has a maximum reaction force in a die clamping state, and projects the projection pin while gradually reducing the reaction force in a projection process, and
   the second spring projects the projection pin with a constant reaction force while projecting the projection pin from the die clamping state,
   where stop of movement of the projection pin during the projection process causes compression of the second spring to increase the reaction force of the second spring, thereby energizing the projection pin to further project the projection pin, wherein
   the projection pin has a lower flange at a bottom or a lower portion of the projection pin and an upper flange at an intermediate portion or an upper portion of the projection pin,
   the first spring is arranged below the lower flange such that the first spring at a compressed state is in contract with the lower flange, and
   the second spring is arranged below the upper spring such that the second spring at a compressed state is in contact with the upper flange,
   where a projection direction of the projection pin is defined as upper direction, and a direction opposite to the projection direction is defined as lower direction.

2. The projection mechanism of the molding die as claimed in claim 1, wherein
   the second spring is arranged above an elector plate member such that the second spring is in contact with the elector plate member at a compressed state; and
   the second spring is compressed by the ejector plate member when a load not less than the reaction forces of the first spring and the second spring is applied to the projection pin in a direction opposite to the projection direction.

3. The projection mechanism of the molding die as claimed in claim 2, wherein
   the ejector plate member has an insertion hole in which the projection pin is inserted, and where the lower flange is incapable of passing through the insertion hole, the projection pin is inserted movably in the insertion hole such that the lower flange and the upper flange are located at opposite sides with respect to the ejector plate member.

4. The projection mechanism of the molding die as claimed in claim 1, wherein the projection pin includes a travel restriction member configured to restrict movement of the projection pin.

5. The projection mechanism of the molding die as claimed in claim 4, wherein the travel restriction member is the upper flange.

6. The projection mechanism of the molding die as claimed in claim 1, wherein the molding die comprises an undercut processing mechanism, and the projection pin is configured to push out the undercut processing mechanism.

7. The projection mechanism of the molding die as claimed in claim 1, further comprising:

an attachment tool configured to attach the first spring to the fixed-side die or the movable-side die, wherein the attachment tool holds the first spring in a predetermined attitude at a predetermined position with respect to the fixed-side die or the movable-side die, and the attachment tool further functions as a stopper configured to prevent movement of the projection pin in the die clamping state.

8. The projection mechanism of the molding die as claimed in claim 7, wherein the attachment tool is a holder housing the first spring, the holder comprising an outer holder mounted to the fixed-side die or the movable-side die and an inner holder located inside the outer holder and slidably engaged with the outer holder, the first spring is housed in the holder and projects the projection pin, and a top of the inner holder comes into contact with a bottom of the projection pin in the die clamping state, thereby functioning as the stopper.

9. The projection mechanism of the molding die as claimed in claim 8, wherein the holder has an opening such that the first spring housed in the holder is visible through the opening.

10. The projection mechanism of the molding die as claimed in claim 7, wherein the attachment tool is a bar member mounted to the fixed-side die or the movable-side die, the first spring has the bar member inserted therein, and in the die clamping state, a top of the bar member comes into contact with a bottom of the projection pin, thereby functioning as the stopper.

11. The projection mechanism of the molding die as claimed in claim 1, comprising a plurality of sets, where each single set comprises the projection pin, the first spring, and the second spring, or comprises the projection pin, the first spring, the second spring, and the attachment tool.

12. A fixed-side die comprising the projection mechanism of the molding die as claimed in claim 1.

13. A movable-side die comprising the projection mechanism of the molding die as claimed in claim 1.

14. A molding die comprising the fixed-side die as claimed in claim 12.

15. A molding die comprising the movable-side die as claimed in claim 13.

16. A molding die comprising a fixed-side die and a movable-side die, both the fixed side-die and the movable-side die each comprising the projection mechanism of the molding die as claimed in claim 1.

17. A molded article molded by the die as claimed in claim 14.

* * * * *

UNITED STATES PATENT AND TRADEMARK OFFICE
CERTIFICATE OF CORRECTION

PATENT NO. : 10,870,228 B2  
APPLICATION NO. : 15/821022  
DATED : December 22, 2020  
INVENTOR(S) : Masanori Sorimoto Page 1 of 1

It is certified that error appears in the above-identified patent and that said Letters Patent is hereby corrected as shown below:

In the Claims

Column 16, Line 56:
In Claim 2, delete "elector" and insert -- ejector --, therefor.

Column 16, Line 58:
In Claim 2, delete "elector" and insert -- ejector --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*